US012623564B2

(12) United States Patent (10) Patent No.: US 12,623,564 B2
Sun et al. (45) Date of Patent: May 12, 2026

(54) VEHICLE STARTING METHOD, POWER SUPPLY, AND VEHICLE

(71) Applicant: SHENZHEN YINWANG INTELLIGENT TECHNOLOGIES CO., LTD., Shenzhen (CN)

(72) Inventors: Jian Sun, Shanghai (CN); Hui Wang, Shenzhen (CN); Lulu Yang, Shanghai (CN); Tianzhu Song, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 48 days.

(21) Appl. No.: 18/607,370

(22) Filed: Mar. 15, 2024

(65) Prior Publication Data

US 2024/0217364 A1 Jul. 4, 2024

Related U.S. Application Data

(63) Continuation of application No. PCT/CN2021/119109, filed on Sep. 17, 2021.

(51) Int. Cl.
*B60L 53/16* (2019.01)
*B60L 53/53* (2019.01)
*B60L 53/62* (2019.01)

(52) U.S. Cl.
CPC .............. *B60L 53/53* (2019.02); *B60L 53/16* (2019.02); *B60L 53/62* (2019.02); *B60L 2240/547* (2013.01); *B60L 2240/549* (2013.01)

(58) Field of Classification Search
CPC ............. H02M 7/4837; H02M 1/0095; H02M 7/53871; H02J 1/10; H02J 7/00;
(Continued)

(56) References Cited

U.S. PATENT DOCUMENTS

2018/0086220 A1 3/2018 Yang et al.
2020/0185936 A1 6/2020 Oishi et al.

FOREIGN PATENT DOCUMENTS

CN 107399287 A 11/2017
CN 109728642 A * 5/2019
(Continued)

OTHER PUBLICATIONS

International Search Report and Written Opinion in International Appln. No. PCT/CN2021/119109, mailed on Jun. 10, 2022, 18 pages (with English Translation).
(Continued)

*Primary Examiner* — Elim Ortiz
(74) *Attorney, Agent, or Firm* — Fish & Richardson P.C.

(57) ABSTRACT

Examples of vehicle starting methods, power supplies, and vehicles are described. One example method includes obtaining a voltage of a first battery of a vehicle by an external power supply. When the voltage of the first battery is lower than a first voltage threshold, a second battery of the external power supply is controlled to supply power to the vehicle, to start the vehicle. In this way, whether the first battery has an insufficient voltage may be determined by obtaining the voltage of the first battery of the vehicle, and after it is determined that the first battery has the insufficient voltage, electrical energy for starting the vehicle is provided by the second battery of the external power supply, to start the vehicle.

6 Claims, 15 Drawing Sheets

(58) Field of Classification Search
CPC ..... H02J 7/34; H02J 7/342; B60L 1/00; B60L
3/0092; B60L 53/16; B60L 53/53; B60L
53/62; B60L 58/20; B60L 2240/547;
B60L 2240/549; B60R 16/03; B60R
16/033; B60R 16/04; B60R 16/06; Y02T
10/70
USPC .................................................. 307/9.1, 10.1
See application file for complete search history.

(56) References Cited

FOREIGN PATENT DOCUMENTS

| CN | 111566890 A | 8/2020 |
| CN | 109728642 B | 6/2021 |

OTHER PUBLICATIONS

Extended European Search Report in European Appln. No. 21957128.
8, mailed on Sep. 6, 2024, 7 pages.

* cited by examiner

Figure 6:
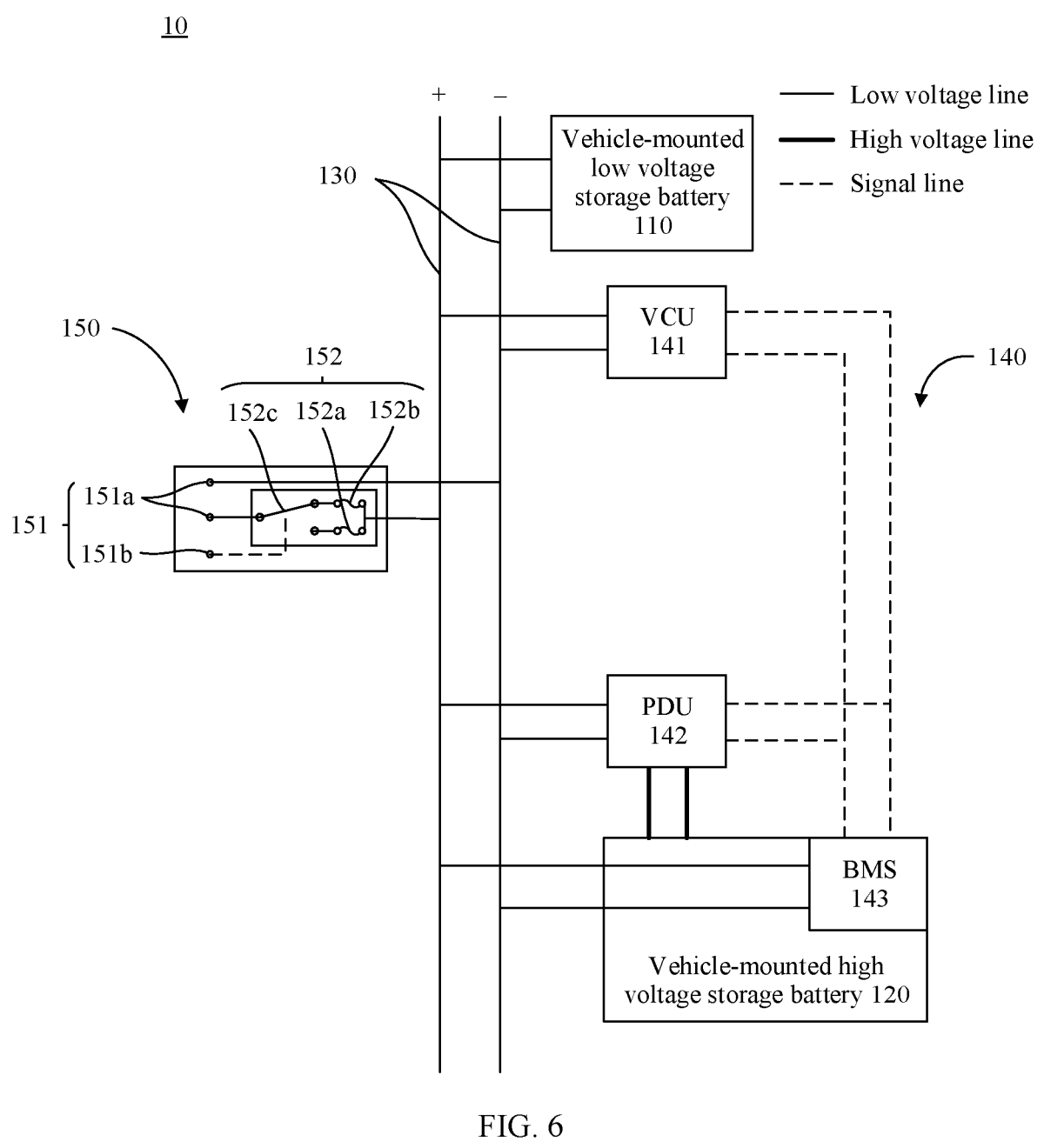

10

Low voltage line

High voltage line

- - - Signal line

130

150

152

152c  152a  152b

151 { 151a
      151b

Vehicle-mounted
low voltage
storage battery
110

VCU
141

140

PDU
142

BMS
143

Vehicle-mounted high
voltage storage battery 120

VEHICLE STARTING METHOD, POWER SUPPLY, AND VEHICLE

CROSS-REFERENCE TO RELATED APPLICATIONS

This application is a continuation of International Application No. PCT/CN2021/119109, filed on Sep. 17, 2021, the disclosure of which is hereby incorporated by reference in its entirety.

TECHNICAL FIELD

This application relates to the technical field of electric vehicles, and in particular, to a vehicle starting method, a power supply, and a vehicle.

BACKGROUND

With continuous development and evolution of intelligentization and electrification of a vehicle, more functions are developed and applied to the vehicle, so that functions of the vehicle are increasingly rich and powerful, and a quantity and performance of controllers are gradually increased. To enable various functions of the vehicle to function normally, no matter whether the vehicle is running or stalls, a vehicle-mounted low voltage storage battery (also referred to as an auxiliary battery) is required to continuously supply low voltage electrical energy. Therefore, if the vehicle is parked for a long time, power of the vehicle-mounted low voltage storage battery in the vehicle may be gradually consumed, and finally the vehicle-mounted low voltage storage battery is in an insufficient voltage (that is, the power of the battery is lower than a preset value) state. When the vehicle-mounted low voltage storage battery is in the insufficient voltage state, because a controller cannot obtain sufficient low voltage electrical energy, the controller cannot work. In this case, a part using an electronic lock, for example, a vehicle door, a front cover plate, or a rear cover plate of the vehicle, cannot be opened by using an electronic key. If the vehicle is equipped with a mechanical key, the vehicle door, the front cover plate, and the rear cover plate of the vehicle can be opened by using the mechanical key, and then a plurality of components for protecting and hiding the vehicle-mounted low voltage storage battery may be removed by using a special-purpose tool, to enable a positive electrode and a negative electrode of the vehicle-mounted low voltage storage battery to be exposed. If the vehicle is not equipped with a mechanical key, the plurality of components for protecting and hiding the vehicle-mounted low voltage storage battery may be removed after the vehicle door, the front cover plate, and the rear cover plate of the vehicle are opened by using the special-purpose tool, to enable the positive electrode and the negative electrode of the vehicle-mounted low voltage storage battery to be exposed. Finally, a positive electrode and a negative electrode of an emergency power supply are connected to the positive electrode and the negative electrode of the vehicle-mounted low voltage storage battery, to provide low voltage electricity to the vehicle by using the emergency power supply and start the vehicle.

SUMMARY

This application provides a vehicle starting method, a power supply, and a vehicle, so that when a first battery of the vehicle has an insufficient voltage and fails to start the vehicle, electrical energy for starting the vehicle may be provided, to start the vehicle.

According to a first aspect, this application provides a vehicle starting method. The method includes: obtaining a voltage of a first battery of a vehicle; and when the voltage of the first battery is lower than a first voltage threshold, controlling a second battery of an external power supply to supply power to the vehicle. In this way, whether the first battery has an insufficient voltage may be determined by obtaining the voltage of the first battery of the vehicle, and after it is determined that the first battery has the insufficient voltage, electrical energy for starting the vehicle is provided by the second battery of the external power supply, to start the vehicle.

As a possible implementation in the first aspect, the controlling a second battery of an external power supply to supply power to the vehicle includes: controlling the second battery to supply power to the vehicle through a first circuit. A maximum operating current allowed by the first circuit is a first current threshold. In this way, overload protection may be provided through the first circuit, to avoid damage to an electronic component like a controller in the vehicle due to an excessively large current.

As a possible implementation in the first aspect, the method further includes: when the voltage of the first battery is higher than a second voltage threshold, controlling the second battery to stop supplying power to the vehicle. After the vehicle is started, the controller in the vehicle controls a high voltage battery in the vehicle to charge the first battery. Therefore, when it is detected that the voltage of the first battery is higher than the second voltage threshold, it may be determined that the high voltage battery starts to charge the first battery, and the vehicle has been started. Therefore, the second battery may be controlled to stop supplying power, to reduce electrical energy of the second battery.

As a possible implementation in the first aspect, the controlling the second battery to stop supplying power to the vehicle includes: controlling the external power supply to be connected to the vehicle through a second circuit. A maximum operating current allowed by the second circuit is a second current threshold. In this way, when the second battery stops supplying power and a current value for the overload protection does not need to be set to the first current threshold, the second circuit may be switched back, to switch the current value for the overload protection to the second current threshold and provide overload protection of a corresponding current for another function.

As a possible implementation in the first aspect, before the obtaining a voltage of a first battery of a vehicle, the method further includes: controlling the external power supply to be connected to the vehicle through the second circuit. In this way, before the voltage of the first battery is obtained, overload protection may be provided through the second circuit. When the second battery is needed to supply power to the vehicle, the first circuit provides the overload protection. After the second battery stops supplying power to the vehicle, the second circuit is switched back, to provide the overload protection. In this way, the overload protection of the corresponding current may be switched based on a requirement, to provide matched overload protection for a related electronic component in the vehicle.

As a possible implementation in the first aspect, the method further includes: obtaining a voltage of the second battery, and when the voltage of the second battery is lower than a third voltage threshold, controlling the vehicle to charge the second battery. In this way, when the voltage of the second battery is lower than the third voltage threshold, it may be determined that the second battery is in an insufficient voltage state, and the second battery cannot provide sufficient electrical energy for starting the vehicle next time. Therefore, the second battery may be charged by using the vehicle, so that when a user starts the vehicle by using the external power supply next time, the second battery can provide the sufficient electrical energy.

As a possible implementation in the first aspect, the controlling the vehicle to charge the second battery specifically includes: controlling the vehicle to charge the second battery through the first circuit. In this way, the overload protection may be provided through the first circuit, to avoid damage to a related electronic component due to the excessively large current.

As a possible implementation in the first aspect, after the obtaining a voltage of the second battery, the method further includes: generating first prompt information based on the voltage of the second battery. When the voltage of the second battery is lower than the third voltage threshold, the first prompt information includes information indicating that the second battery has insufficient power. In this way, the user may conveniently obtain information of power of the second battery, and the user is reminded when the second battery has insufficient power, to improve user experience.

As a possible implementation in the first aspect, after the obtaining a voltage of a first battery of a vehicle, the method further includes: generating second prompt information based on the voltage of the first battery. When the voltage of the first battery is higher than the first voltage threshold, the second prompt information includes information indicating that power of the first battery is normal. In this way, the user may be helped to determine that the power of the first battery is sufficient for starting the vehicle, and the user needs to detect whether there is another defect resulting that the vehicle cannot be started.

According to a second aspect, this application provides a power supply. The power supply includes: a voltage detection unit, where the voltage detection unit is configured to obtain a voltage of a first battery of a vehicle; and a control unit, where the control unit is configured to: when the voltage of the first battery is lower than a first voltage threshold, control a second battery of the power supply to supply power to the vehicle. In this way, whether the first battery has an insufficient voltage may be determined by obtaining the voltage of the first battery of the vehicle by using the voltage detection unit, and after the control unit determines the first battery has the insufficient voltage, electrical energy for starting the vehicle is provided by the second battery of the external power supply, to start the vehicle.

As a possible implementation in the second aspect, the controlling a second battery of the power supply to supply power to the vehicle includes: controlling the second battery to supply power to the vehicle through a first circuit. A maximum operating current allowed by the first circuit is a first current threshold. In this way, overload protection may be provided through the first circuit, to avoid damage to an electronic component like a controller in the vehicle due to an excessively large current.

As a possible implementation in the second aspect, the control unit is further configured to: when the voltage of the first battery is higher than a second voltage threshold, control the second battery to stop supplying power to the vehicle. After the vehicle is started, the controller in the vehicle controls a high voltage battery in the vehicle to charge the first battery. Therefore, when it is detected that the voltage of the first battery is higher than the second voltage threshold, it may be determined that the high voltage battery starts to charge the first battery, and the vehicle has been started. Therefore, the second battery may be controlled to stop supplying power, to reduce electrical energy of the second battery.

As a possible implementation in the second aspect, the controlling the second battery to stop supplying power to the vehicle includes: controlling the power supply to be connected to the vehicle through a second circuit. A maximum operating current allowed by the second circuit is a second current threshold. In this way, when the second battery stops supplying power and the overload protection does not need to be set to the first current threshold, the second circuit may be switched back, to switch a current value for the overload protection to the second current threshold and provide overload protection of a corresponding current for another function.

As a possible implementation in the second aspect, before the obtaining a voltage of a first battery of a vehicle, the control unit is further configured to: control the power supply to be connected to the vehicle through the second circuit. In this way, before the voltage of the first battery is obtained, overload protection may be provided through the second circuit. When the second battery is needed to supply power to the vehicle, the first circuit provides the overload protection. After the second battery stops supplying power to the vehicle, the second circuit is switched back, to provide the overload protection. In this way, the overload protection of the corresponding current may be switched based on a requirement, to provide matched overload protection for a related electronic component in the vehicle.

As a possible implementation in the second aspect, the voltage detection unit is further configured to obtain a voltage of the second battery; and the control unit is further configured to: when the voltage of the second battery is lower than a third voltage threshold, control the vehicle to charge the second battery. In this way, when the voltage of the second battery is lower than the third voltage threshold, it may be determined that the second battery is in an insufficient voltage state, and the second battery cannot provide sufficient electrical energy for starting the vehicle next time. Therefore, the second battery may be charged by using the vehicle, so that when a user starts the vehicle by using the external power supply next time, the second battery can provide the sufficient electrical energy.

As a possible implementation in the second aspect, the controlling the vehicle to charge the second battery specifically includes: controlling the vehicle to charge the second battery through the first circuit. In this way, the overload protection may be provided through the first circuit, to avoid damage to the related electronic component due to the excessively large current.

As a possible implementation in the second aspect, after the obtaining a voltage of the second battery, the control unit is further configured to: generate first prompt information based on the voltage of the second battery. When the voltage of the second battery is lower than the third voltage threshold, the first prompt information includes information indicating that the second battery has insufficient power. In this way, the user may conveniently obtain information of power of the second battery, and the user is reminded when the second battery has insufficient power, to improve user experience.

As a possible implementation in the second aspect, after the obtaining a voltage of a first battery of a vehicle, the control unit is further configured to: generate second prompt information based on the voltage of the first battery. When the voltage of the first battery is higher than the first voltage threshold, the second prompt information includes information indicating that power of the first battery is normal. In this way, the user may be helped to determine that the power of the first battery is sufficient for starting the vehicle, and the user needs to detect whether there is another defect resulting that the vehicle cannot be started.

As a possible implementation in the second aspect, an output unit is further included. The output unit is configured to display or play the first prompt information or the second prompt information. In this way, the user may conveniently obtain the first information or the second information by using the output unit.

As a possible implementation in the second aspect, a connection unit is further included. The connection unit is configured to be connected to the vehicle. In this way, when the user uses the power supply to start the vehicle, the connection unit may be conveniently connected to the vehicle. This facilitates a user operation.

According to a third aspect, this application provides a vehicle, including a first battery, where the first battery is connected to at least one controller of the vehicle; and a connection portion, where the connection portion is connected to the first battery and the at least one controller, and the connection portion is further configured to be connected to an external power supply. In this way, when the first battery of the vehicle has an insufficient voltage and fails to start the vehicle, the external power supply may be connected by using the connection portion, and electrical energy is provided by the external power supply, to start the vehicle.

As a possible implementation in the third aspect, a switching unit is further included. The switching unit is configured to switch to a first mode under a first condition. In the first mode, the switching unit is configured to connect the connection portion to the at least one controller through a first circuit. The first condition includes: A voltage of the first battery is lower than a first voltage threshold, or the switching unit receives a first signal, and the first signal is used to control the switching unit to work in the first mode. In this way, when the external power supply is needed to provide the electrical energy to start the vehicle, the external power supply may be connected to the controller by switching the first circuit through the switching unit. Therefore, when the external power supply is connected to the connection portion to provide electrical energy for starting the vehicle, the electrical energy may be transmitted to the controller through the first circuit, so that the controller can work normally.

As a possible implementation in the third aspect, the switching unit is configured to switch to a second mode under a second condition. In the second mode, the switching unit is configured to connect the connection portion to the first battery through a second circuit. The second condition includes: The voltage of the first battery is higher than a second voltage threshold, or the switching unit receives a second signal, and the second signal is used to control the switching unit to work in the second mode. In this way, when the external power supply does not need to provide the electrical energy to start the vehicle, the first battery may be connected by switching the second circuit through the switching unit, so that the electrical energy can be obtained from the first battery through the second circuit.

As a possible implementation in the third aspect, the switching unit is configured to switch to a third mode under a third condition. In the third mode, the switching unit is configured to enable the vehicle to supply power to the connection portion through the first circuit. The third condition includes: The switching unit receives a third signal, and the third signal is used to control the switching unit to work in the third mode. In this way, the external power supply may be charged by using the vehicle, so that when a user starts the vehicle by using the external power supply next time, the external power supply can provide sufficient electrical energy.

As a possible implementation in the third aspect, the connection portion is a cigarette lighter interface of the vehicle, or the connection portion is a charging interface of the vehicle. In this way, the connection portion may reuse an existing interface on the vehicle, and a special-purpose interface does not need to be disposed.

As a possible implementation in the third aspect, the vehicle further includes a cover plate. The cover plate is disposed in a cabin of the vehicle or in a place between an outer surface of the vehicle and the connection portion, and is configured to cover the connection portion. In this way, protection may be provided for the connection portion by using the cover plate, to prevent sundries from entering the connection portion and damaging the connection portion.

As a possible implementation in the third aspect, the cover plate is a vehicle logo disposed on the vehicle or a cover plate of a charging interface of a vehicle-mounted high voltage storage battery of the vehicle. In this way, the vehicle logo or the cover plate of the charging interface may be reused, and the cover plate of the connection portion does not need to be specially disposed, to reduce production costs, and avoid affecting an aesthetic appearance of the vehicle due to the cover plate disposed outside the vehicle.

According to a fourth aspect, this application provides a power supply. The power supply includes at least one processor and at least one memory. The memory stores program instructions, and when the program instructions are executed by the at least one processor, the at least one processor is enabled to perform the method according to any possible implementation in the first aspect.

According to a fifth aspect, this application provides a computer-readable storage medium. The computer-readable storage medium stores program instructions, and when the program instructions are executed by a computer, the computer is enabled to perform the method according to any possible implementation in the first aspect.

According to a sixth aspect, this application provides a computer program product. The computer program product stores program instructions, and when the program instructions are executed by a computer, the computer is enabled to perform the method according to any possible implementation in the first aspect.

These aspects and another aspect of this application will be clearer and easier to understand in descriptions of the following (a plurality of) embodiments.

BRIEF DESCRIPTION OF DRAWINGS

The following further describes features of this application and a relationship between the features with reference to the accompanying drawings. The accompanying drawings are all examples, and some features are not shown in actual proportions. In addition, in some accompanying drawings, common features that are not necessary for this application in the field of this application may be omitted. Alternatively, additional features that are not necessary for this application are shown. A combination of the features shown in the accompanying drawings is not intended to limit this application. In addition, in this specification, content referred to by same reference signs is also the same. The specific accompanying drawings are described as follows:

FIG. 6 is a schematic diagram of electrical connection of a first electrical connector;

FIG. 14B-1 and FIG. 14B-2 are the other part of flowchart of a method for controlling an emergency power supply according to an embodiment of this application.

DESCRIPTION OF REFERENCE NUMERALS

Figure 1:
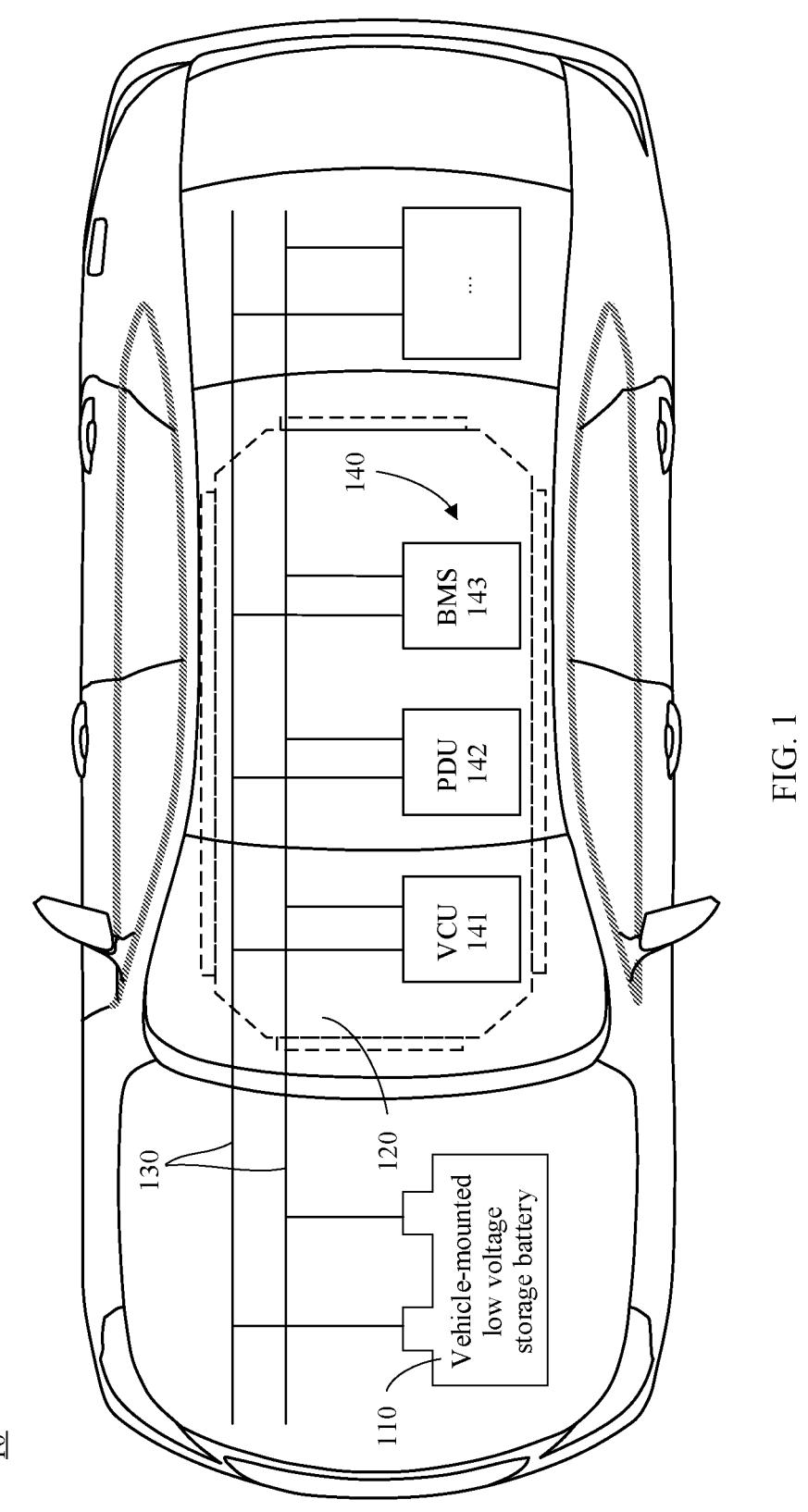
FIG. 1 is a schematic diagram of a vehicle according to an embodiment of this application.

10: vehicle; 110: vehicle-mounted low voltage storage battery, first battery; 120: vehicle-mounted high voltage storage battery; 130: low voltage bus; 140: controller; 141: VCU; 142: PDU; 143: BMS; 150: first electrical connector; 151: first connection portion; 151a: first power contact; 151b: first signal contact; 152: switching unit; 152a: first circuit; 152b: second circuit; 152c: switching switch; 160: cigarette lighter; 170: charging interface; 180: vehicle logo; 20: external power supply; 210: main body; 220: external low voltage storage battery, second battery; 230: voltage detection unit; 240: control unit; 250: output unit; 251: touchscreen; 252: speaker; 260: second electrical connector; 261: second connection portion; 261a: second power contact; 261b: second signal contact; 270: first power supply line, second power supply line; 300: computing device; 310: processor; 320: memory; and 330: communication interface.

DESCRIPTION OF EMBODIMENTS

In this specification and claims, the terms "first, second, third, and the like" or similar terms are only used to distinguish between similar objects, and do not represent a specific order of the objects. It may be understood that specific orders or sequences may be exchanged if allowed, so that embodiments of this application described herein can be implemented in an order other than an order illustrated or described herein.

In the following descriptions, involved reference numerals such as S110 and S120 that indicate steps do not necessarily indicate that the steps are to be performed based on the order, and consecutive steps may be transposed if allowed, or may be performed simultaneously.

The term "include" used in this specification and claims should not be construed as being limited to the content listed below, and does not exclude other elements or steps. Therefore, it should be construed as specifying existence of a mentioned feature, whole, step, or part, but does not exclude existence or addition of one or more other features, wholes, steps, or parts and groups thereof. Therefore, the expression "a device including an apparatus A and an apparatus B" should not be limited to a device including only the apparatus A and the apparatus B.

"One embodiment" or "an embodiment" mentioned in this specification indicates that a particular feature, structure, or property that is described with reference to the embodiment is included in at least one embodiment of the present invention. Therefore, the terms "in one embodiment" or "in an embodiment" that appear in this specification do not necessarily indicate a same embodiment, but may indicate a same embodiment. Further, in one or more embodiments, particular features, structures, or properties can be combined in any proper manner, as would be clear from this disclosure to a person of ordinary skill in the art.

When a vehicle-mounted low voltage storage battery of a vehicle is in an insufficient voltage state, and the vehicle needs to be started in an external electrical bonding manner. One solution is as follows: use a special-purpose tool to open a front cockpit cover of the vehicle in a special manner, remove a cover plate that covers the vehicle-mounted low voltage storage battery, connect a positive electrode of an external power supply to a positive electrode of the vehicle-mounted low voltage storage battery, connect a negative electrode of the external power supply to a negative electrode of the vehicle-mounted low voltage storage battery, or when the negative electrode of the vehicle-mounted low voltage storage battery is not exposed, connect the negative electrode of the external power supply to a vehicle body, open a vehicle door of the vehicle by using a mechanical key, and enter the vehicle, to start the vehicle.

The foregoing solution has at least the following three defects. First, according to this electrical bonding method, disassembling is completed by using a special-purpose tool, and a disassembling process and an electrical bonding process are complex. Internal parts of the vehicle may be damaged due to an error operation, and an operation needs to be performed by a trained professional. Second, the vehicle-mounted low voltage storage battery is not equipped with a special-purpose electrical bonding device. Iron clips are usually used to perform clamping and fixing during electrical bonding. Virtual connection and fire striking are likely to occur due to weak connection, and this may cause an electric shock and a fire disaster. Third, it is impossible to accurately determine whether the vehicle-mounted storage battery really is in the insufficient voltage state.

Another solution is as follows: provide a charging function. That is, when the vehicle is in a stationary state, the vehicle is periodically woken up by using a T-BOX (telematics box) to check power of the vehicle-mounted low voltage storage battery, and determine whether a status of the entire vehicle meets a charging condition by using a VCU (vehicle control unit). If the charging condition is met, related components such as a BMS (battery management system) and a PDU (power distribution unit) are woken up, a vehicle-mounted high voltage storage battery (also referred to as a power battery) in the vehicle provides a high voltage direct current, and a DC/DC (direct current converter) module in the PDU converts the high voltage direct current into a low voltage direct current, to charge the vehicle-mounted low voltage storage battery. This prevents an insufficient voltage of the vehicle-mounted low voltage storage battery.

The foregoing solution has at least the following two defects. First, when the entire vehicle is periodically woken up by using the T-BOX, the VCU first determines whether a SOC (state of charge) of the vehicle-mounted high voltage storage battery meets a requirement. For example, if the SOC is less than 15%, the charging function cannot be enabled. Therefore, after the vehicle is stationary for a long time, the vehicle-mounted low voltage storage battery still has an insufficient voltage risk. Second, the charging function involves cooperation work of a plurality of components. If one of the components breaks down, expected effect cannot be achieved. As a result, reliability of the charging function is affected, and the vehicle-mounted low-voltage storage battery still has the insufficient voltage risk.

Based on the defects existing in the conventional technology, this application provides a vehicle starting method by using an external power supply, a power supply, and a vehicle. When the vehicle is in the insufficient voltage state and cannot be started, electrical energy for starting the vehicle is provided, to start the external power supply of the vehicle.

FIG. 1 is a schematic diagram of a vehicle 10 according to an embodiment of this application. As shown in FIG. 1, a vehicle-mounted low voltage storage battery 110 (equivalent to a first battery), a vehicle-mounted high voltage storage battery 120, a low voltage bus 130, and a controller 140 including a VCU 141, a PDU 142, a BMS 143, and the like are disposed in the vehicle 10.

In this application, the vehicle 10 may be a battery electric vehicle or a hybrid electric vehicle in an electric vehicle, and may be any one of different types of vehicles such as a car, a truck, a passenger bus, and an SUV (sport utility vehicle). Alternatively, the vehicle 10 may be a land transport apparatus for carrying people or goods, for example, a tricycle, a motorcycle, or a train.

Figure 2:
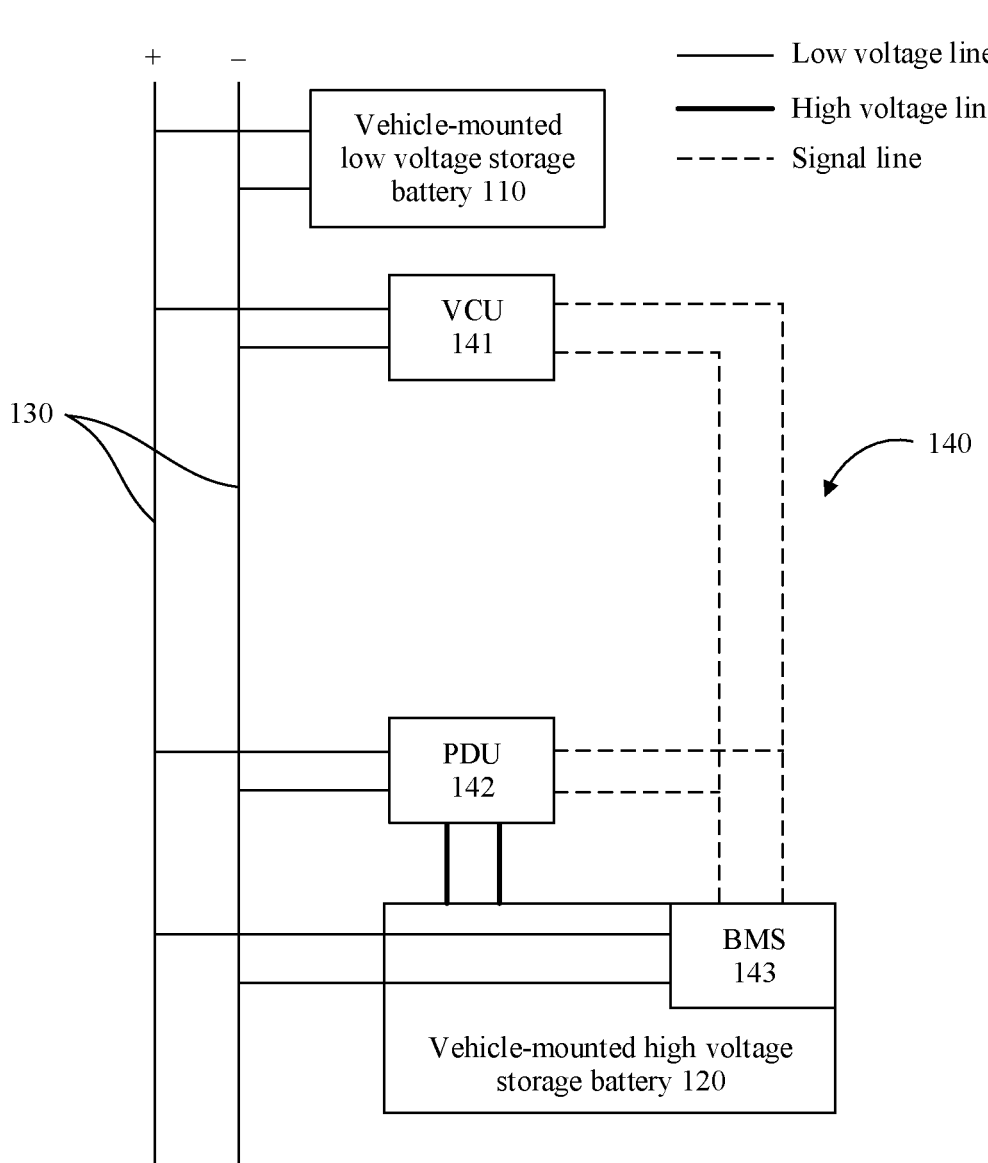
FIG. 2 is a schematic diagram of electrical connection of some apparatuses in a vehicle.

FIG. 2 is a schematic diagram of electrical connection of some apparatuses in the vehicle 10, and shows an electrical connection relationship of the apparatuses in the vehicle 10 in FIG. 1. As shown in FIG. 2, a positive electrode and a negative electrode of the vehicle-mounted low voltage storage battery 110 are respectively electrically connected to a positive low voltage line and a negative low voltage line of the low voltage bus 130. The controller 140 including the VCU 141, the PDU 142, the BMS 143, and the like is electrically connected to the low voltage bus 130 through a low voltage line. The controller 140 including the VCU 141, the PDU 142, the BMS 143, and the like works normally after obtaining low voltage electricity such as 9 V to 16 V. The vehicle-mounted low voltage storage battery 110 may provide the low voltage electricity such as 9 V to 16 V for the controller 140 including the VCU 141, the PDU 142, the BMS 143, and the like through the low voltage bus 130, so that the controller 140 can work normally.

The vehicle-mounted high voltage storage battery 120 is configured to provide high voltage electricity such as 300 V to 800 V for a high voltage system like a drive system of the vehicle 10. The PDU 142 may implement electrical connection to the vehicle-mounted high voltage storage battery 120 through a high voltage line, is configured to provide functions for the high voltage system in the vehicle 10, such as charging and discharging control, power-on control for a high voltage component, overload short-circuit protection for a circuit, and high voltage sampling, and is configured to protect and monitor running of the high voltage system. A DC/DC module is further disposed in the PDU 142. The DC/DC module may convert high voltage electricity provided by the high voltage storage battery into low voltage electricity, for example, 13.5 V, to charge the vehicle-mounted low voltage storage battery 110. To protect a safe control system used by the vehicle-mounted high voltage storage battery 120, the BMS 143 may monitor the vehicle-mounted high voltage storage battery 120 in real time, and may control charging or discharging of the vehicle-mounted high voltage storage battery 120, to avoid overcharging and overdischarging. The VCU 141 is a core electronic control apparatus for implementing vehicle control decision-making. The VCU 141, the PDU 142, the BMS 143, and the like that are included in the controller 140 are electrically connected to each other through signal lines, to implement controlling of the PDU 142 and the BMS 143.

When the vehicle-mounted low voltage storage battery 110 is in an insufficient voltage state, if the controller 140 cannot obtain sufficient low voltage electricity from the vehicle-mounted low voltage storage battery 110, the controller 140 including the VCU 141, the PDU 142, the BMS 143, and the like cannot work normally. In this case, an electronic lock of a vehicle door and a tail gate of the vehicle 10 cannot work, and a user cannot enter a cockpit of the vehicle. Even if the user opens the vehicle door by using a mechanical key and enters the cockpit, the user still cannot start the vehicle 10. Even if a charging interface 170 of the vehicle 10 is connected to a charging pile, because the controller 140 including the VCU 141, the PDU 142, the BMS 143, and the like cannot work, charging of the vehicle 10 cannot be implemented.

This application provides the following embodiments of a vehicle starting method, an external power supply 20, and the vehicle 10 described in detail, so that when the vehicle-mounted low voltage storage battery 110 has an insufficient voltage, the external power supply 20 can provide electrical energy, to start the vehicle 10.

Figure 3A:
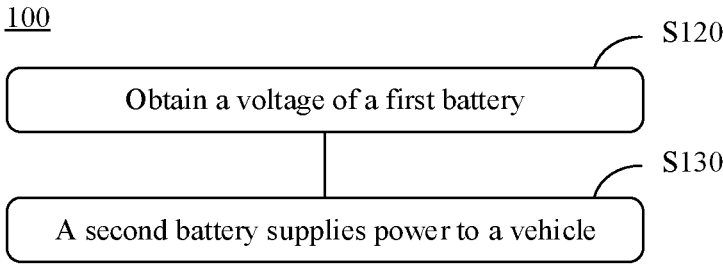
FIG. 3A is a schematic flowchart of a vehicle starting method according to an embodiment of this application.

FIG. 3A is a schematic flowchart of a vehicle starting method 100 according to an embodiment of this application. The method 100 shown in FIG. 3A may be performed by, for example, the external power supply 20 or any other proper apparatus, so that when the first battery 110 has an insufficient voltage, the external power supply 20 is controlled to supply power to the vehicle 10, to start the vehicle 10. The method 100 includes step S120 and step S130.

Step S120: Obtain a voltage of the first battery 110 of the vehicle 10.

Step S130: When the voltage of the first battery 110 is lower than a first voltage threshold, control a second battery 220 of the external power supply 20 to supply power to the vehicle 10.

In this way, whether the first battery 110 has an insufficient voltage may be determined by obtaining the voltage of the first battery 110 of the vehicle 10, and after it is determined that the first battery 110 has an insufficient voltage, electrical energy for starting the vehicle 10 is provided by the second battery 220 of the external power supply 20, to start the vehicle 10.

In some embodiments, step S130 further includes step S131.

Step S131: The controlling a second battery 220 of the external power supply 20 to supply power to the vehicle 10 specifically includes: controlling the second battery 220 to supply power to the vehicle 10 through a first circuit 152*a*. A maximum operating current allowed by the first circuit 152*a* is a first current threshold.

In this way, overload protection may be provided through the first circuit 152*a*, to avoid damage to an electronic component like the controller 140 in the vehicle 10 due to an excessively large current.

In some embodiments, the method 100 further includes step S140.

Step S140: When the voltage of the first battery 110 is higher than a second voltage threshold, control the second battery 220 to stop supplying power to the vehicle 10.

After the vehicle 10 is started, the controller 140 in the vehicle 10 controls the high voltage storage battery 120 in the vehicle 10 to charge the first battery 110. Therefore, when it is detected that the voltage of the first battery 110 is higher than the second voltage threshold, it may be determined that the high voltage storage battery 120 starts to charge the first battery 110, and the vehicle 10 has been started. Therefore, the second battery 220 may be controlled to stop supplying power, to reduce electrical energy of the second battery 220.

In some embodiments, step S140 further includes step S141.

Step S141: The controlling the second battery 220 to stop supplying power to the vehicle 10 specifically includes: controlling the external power supply 20 to be connected to the vehicle 10 through a second circuit 152*b*. A maximum operating current allowed by the second circuit 152*b* is a second current threshold.

In this way, when the second battery 220 stops supplying power and the overload protection does not need to be set to the first current threshold, the second circuit 152*b* may be switched back, to switch a current value for the overload protection to the second current threshold and provide overload protection of a corresponding current for another function.

In some embodiments, the method 100 further includes step S110.

Step S110: Before the obtaining a voltage of a first battery 110 of the vehicle 10, control the external power supply 20 to be connected to the vehicle 10 through the second circuit 152*b*.

In this way, before the voltage of the first battery 110 is obtained, overload protection may be provided through the second circuit 152*b*. When the second battery 220 is needed to supply power to the vehicle 10, the first circuit 152*a* provides the overload protection. After the second battery 220 stops supplying power to the vehicle 10, the second circuit 152*b* is switched back, to provide the overload protection. In this way, the overload protection of the corresponding current may be switched based on a requirement, to provide matched overload protection for a related electronic component in the vehicle 10.

In some embodiments, the method 100 further includes step S150.

Step S150: Obtain a voltage of the second battery 220, and when the voltage of the second battery 220 is lower than a third voltage threshold, control the vehicle 10 to charge the second battery 220.

In this way, when the voltage of the second battery 220 is lower than the third voltage threshold, it may be determined that the second battery 220 is in an insufficient voltage state, and the second battery 220 cannot provide sufficient electrical energy for starting the vehicle 10 next time. Therefore, the second battery 220 may be charged by using the vehicle 10, so that when a user starts the vehicle 10 by using the external power supply 20 next time, the second battery 220 can provide the sufficient electrical energy.

In some embodiments, step S150 further includes step S151.

Step S151: The controlling the vehicle 10 to charge the second battery 220 specifically includes: controlling the vehicle 10 to charge the second battery 220 through the first circuit 152*a*.

In this way, the overload protection may be provided through the first circuit 152*a*, to avoid damage to the related electronic component due to the excessively large current.

In some embodiments, the method 100 further includes step S160.

Step S160: after the obtaining a voltage of the second battery 220, generate first prompt information based on the voltage of the second battery 220. When the voltage of the second battery 220 is lower than the third voltage threshold, the first prompt information includes information indicating that the second battery 220 has insufficient power.

In this way, the user may conveniently obtain information of power of the second battery 220, and the user is reminded when the second battery 220 has insufficient power, to improve user experience.

In some embodiments, the method 100 further includes step S170.

Step S170: After the obtaining a voltage of the first battery 110 of the vehicle 10, generate second prompt information based on the voltage of the first battery 110. When the voltage of the first battery 110 is higher than the first voltage threshold, the second prompt information includes information indicating that power of the first battery 110 is normal.

In this way, the user may be helped to determine that the power of the first battery 110 is sufficient for starting the vehicle 10, and the user needs to detect whether there is another defect resulting that the vehicle 10 cannot be started.

In embodiments of this application, the foregoing describes in detail the method embodiment of the vehicle starting method with reference to FIG. 3A. The following describes in detail an apparatus embodiment of an external power supply 20 in this application with reference to FIG. 3B. It should be understood that the descriptions of the method embodiment correspond to descriptions of the apparatus embodiment. Therefore, for parts that are not described in detail, refer to the descriptions in the foregoing method embodiment.

Figure 3B:
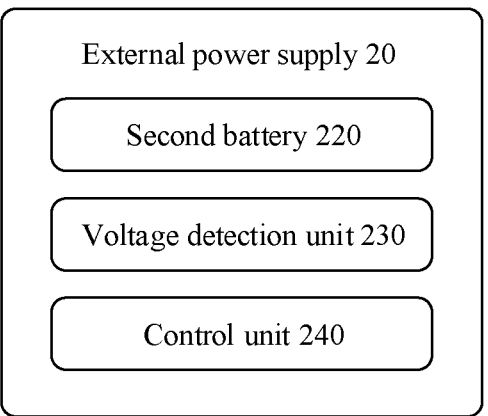
FIG. 3B is a schematic diagram of a structure of an external power supply according to an embodiment of this application.

FIG. 3B is a schematic diagram of a structure of the external power supply 20 according to an embodiment of this application. As shown in FIG. 3B, the external power supply 20 in this embodiment of this application includes: a voltage detection unit 230, where the voltage detection unit 230 is configured to obtain a voltage of a first battery 110 of a vehicle 10; and a control unit 240, where the control unit 240 is configured to: when the voltage of the first battery 110 is lower than a first voltage threshold, control a second battery 220 of the external power supply 20 to supply power to the vehicle 10. In this way, whether the first battery 110 has an insufficient voltage may be determined by obtaining the voltage of the first battery 110 of the vehicle 10 by using the voltage detection unit 230, and after the control unit 240 determines the first battery 110 has an insufficient voltage, electrical energy for starting the vehicle 10 is provided by the second battery 220 of the external power supply 20, to start with the vehicle 10.

In some embodiments, the controlling the second battery 220 of the external power supply 20 to supply power to the vehicle 10 specifically includes: controlling the second battery 220 to supply power to the vehicle 10 through a first circuit 152a. A maximum operating current allowed by the first circuit 152a is a first current threshold. In this way, overload protection may be provided through the first circuit 152a, to avoid damage to an electronic component like a controller 140 in the vehicle 10 due to an excessively large current.

In some embodiments, the control unit 240 is further configured to: when the voltage of the first battery 110 is higher than a second voltage threshold, control the second battery 220 to stop supplying power to the vehicle 10. After the vehicle 10 is started, the controller 140 in the vehicle 10 controls the high voltage storage battery 120 in the vehicle 10 to charge the first battery 110. Therefore, when it is detected that the voltage of the first battery 110 is higher than the second voltage threshold, it may be determined that the high voltage storage battery 120 starts to charge the first battery 110, and the vehicle 10 has been started. Therefore, the second battery 220 may be controlled to stop supplying power, to reduce electrical energy of the second battery 220.

In some embodiments, the controlling the second battery 220 to stop supplying power to the vehicle 10 specifically includes: controlling the external power supply 20 to be connected to the vehicle 10 through a second circuit 152b. A maximum operating current allowed by the second circuit 152b is a second current threshold. In this way, when the second battery 220 stops supplying power and a current value for the overload protection does not need to be set to the first current threshold, the second circuit 152b may be switched back, to switch the current value for the overload protection to the second current threshold and provide overload protection of a corresponding current for another function.

In some embodiments, before the obtaining a voltage of a first battery 110 of a vehicle 10, the control unit 240 is further configured to control the power supply to be connected to the vehicle 10 through the second circuit 152b. In this way, before the voltage of the first battery 110 is obtained, overload protection may be provided through the second circuit 152b. When the second battery 220 is needed to supply power to the vehicle 10, the first circuit 152a provides the overload protection. After the second battery 220 stops supplying power to the vehicle 10, the second circuit 152b is switched back, to provide the overload protection. In this way, the overload protection of the corresponding current may be switched based on a requirement, to provide matched overload protection for a related electronic component in the vehicle 10.

In some embodiments, the voltage detection unit 230 is further configured to obtain a voltage of the second battery 220, and the control unit 240 is further configured to: when the voltage of the second battery 220 is lower than a third voltage threshold, control the vehicle 10 to charge the second battery 220. In this way, when the voltage of the second battery 220 is lower than the third voltage threshold, it may be determined that the second battery 220 is in an insufficient voltage state, and the second battery 220 cannot provide sufficient electrical energy for starting the vehicle 10 next time. Therefore, the second battery 220 may be charged by using the vehicle 10, so that when a user starts the vehicle 10 by using the external power supply 20 next time, the second battery 220 can provide the sufficient electrical energy.

In some embodiments, the controlling the vehicle 10 to charge the second battery 220 specifically includes: controlling the vehicle 10 to charge the second battery 220 through the first circuit 152a. In this way, the overload protection may be provided through the first circuit 152a, to avoid damage to the related electronic component due to the excessively large current.

In some embodiments, after the voltage of the second battery 220 is obtained, the control unit 240 is further configured to generate first prompt information based on the voltage of the second battery 220. When the voltage of the second battery 220 is lower than the third voltage threshold, the first prompt information includes information indicating that the second battery 220 has insufficient power. In this way, the user may conveniently obtain information of power of the second battery 220, and the user is reminded when the second battery 220 has insufficient power, to improve user experience.

In some embodiments, after the obtaining a voltage of a first battery 110 of a vehicle 10, the control unit 240 is further configured to generate second prompt information based on the voltage of the first battery 110. When the voltage of the first battery 110 is higher than the first voltage threshold, the second prompt information includes information indicating that power of the first battery 110 is normal. In this way, the user may be helped to determine that the power of the first battery 110 is sufficient for starting the vehicle 10, and the user needs to detect whether there is another defect resulting that the vehicle 10 cannot be started.

In some embodiments, the apparatus further includes an output unit 250. The output unit 250 is configured to display or play the first prompt information or the second prompt information. In this way, the user may conveniently obtain the first information or the second information by using the output unit 250.

In some embodiments, a connection unit is further included. The connection unit is configured to be connected to the vehicle 10. In this way, when the user uses the power supply to start the vehicle 10, the power supply may be connected to the vehicle 10 by using the connection unit. This facilitates a user operation.

Figure 4:
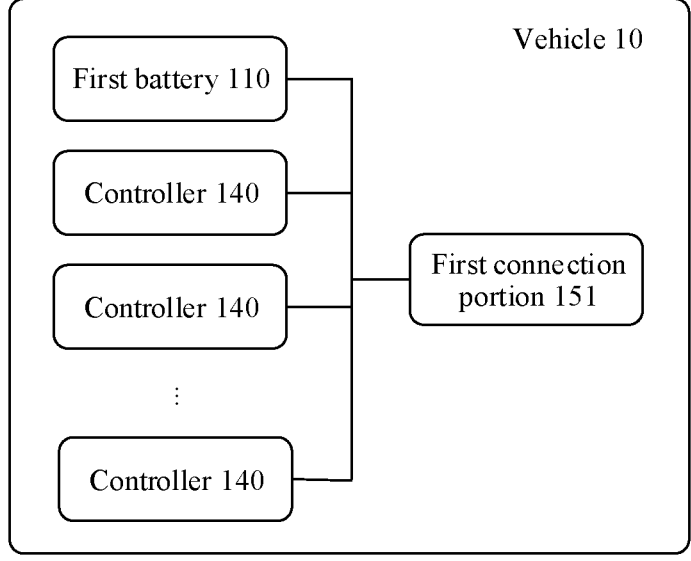
FIG. 4 is a schematic diagram of a structure of a vehicle according to an embodiment of this application.

FIG. 4 is a schematic diagram of a structure of a vehicle 10 according to an embodiment of this application. As shown in FIG. 4, this application further provides the vehicle 10 including a first battery 110, where the first battery 110 is connected to at least one controller 140 of the vehicle 10; and a first connection portion 151, where the first connection portion 151 is connected to the first battery 110 and the at least one controller 140, and the first connection portion 151 is further configured to be connected to an external power supply 20. In this way, when the first battery 110 of the vehicle 10 has an insufficient voltage and fails to start the vehicle 10, the external power supply 20 may be connected by using the first connection portion 151, and electrical energy is provided by the external power supply 20, to start the vehicle 10.

In some embodiments, a switching unit 152 is further included. The switching unit 152 is configured to switch to a first mode under a first condition. In the first mode, the switching unit 152 is configured to connect the first connection portion 151 to the at least one controller 140 through a first circuit 152a. The first condition includes: A voltage of the first battery 110 is lower than a first voltage threshold, or the switching unit 152 receives a first signal, and the first signal is used to control the switching unit 152 to work in the first mode. In this way, when the external power supply 20 is needed to provide the electrical energy to start the vehicle 10, the external power supply 20 may be connected to the controller 140 by switching the first circuit 152a through the switching unit 152. Therefore, when the external power supply 20 is connected to the first connection portion 151 to provide electrical energy for starting the vehicle 10, the electrical energy may be transmitted to the controller 140 through the first circuit 152a, so that the controller 140 can work normally.

In some embodiments, the switching unit 152 is configured to switch to a second mode under a second condition. In the second mode, the switching unit 152 is configured to connect the first connection portion 151 to the first battery 110 through a second circuit 152b. The second condition includes: The voltage of the first battery 110 is higher than a second voltage threshold, or the switching unit 152 receives a second signal, and the second signal is used to control the switching unit 152 to work in the second mode. In this way, when the external power supply 20 does not need to provide the electrical energy to start the vehicle 10, the first battery 110 may be connected by switching the second circuit 152b through the switching unit 152, so that the electrical energy can be obtained from the first battery 110 through the second circuit 152b.

In some embodiments, the switching unit 152 is configured to switch to a third mode under a third condition. In the third mode, the switching unit 152 is configured to enable the vehicle 10 to supply power to the first connection portion 151 through the first circuit 152a. The third condition includes: The switching unit 152 receives a third signal, and the third signal is used to control the switching unit 152 to work in the third mode. In this way, the external power supply 20 may be charged by using the vehicle 10, so that when a user starts the vehicle 10 by using the external power supply 20 next time, the external power supply 20 can provide sufficient electrical energy.

In some embodiments, the first connection portion 151 is a cigarette lighter interface of the vehicle 10, or the first connection portion 151 is a charging interface 170 of the vehicle 10. In this way, the first connection portion 151 may reuse an existing interface on the vehicle 10, and a special-purpose interface does not need to be disposed.

In some embodiments, a cover plate is further included. The cover plate is disposed in a cabin of the vehicle 10 or in a place between an outer surface of the vehicle 10 and the first connection portion 151, and is configured to cover the first connection portion 151. In this way, protection may be provided for the first connection portion 151 by using the cover plate, to prevent sundries from entering the first connection portion 151 and damaging the first connection portion 151.

In some embodiments, the cover plate is a vehicle logo 180 disposed on the vehicle 10 or a cover plate of a charging interface 170 of a vehicle-mounted high voltage storage battery of the vehicle 10. In this way, the vehicle logo 180 or the cover plate of the charging interface 170 may be reused, and the cover plate of the first connection portion 151 does not need to be specially disposed, to reduce production costs, and avoid affecting an aesthetic appearance of the vehicle 10 due to the cover plate disposed outside the vehicle 10.

The following describes in detail the vehicle starting method, the external power supply 20, and the vehicle 10 in embodiments of this application with reference to specific embodiments.

Figure 5:
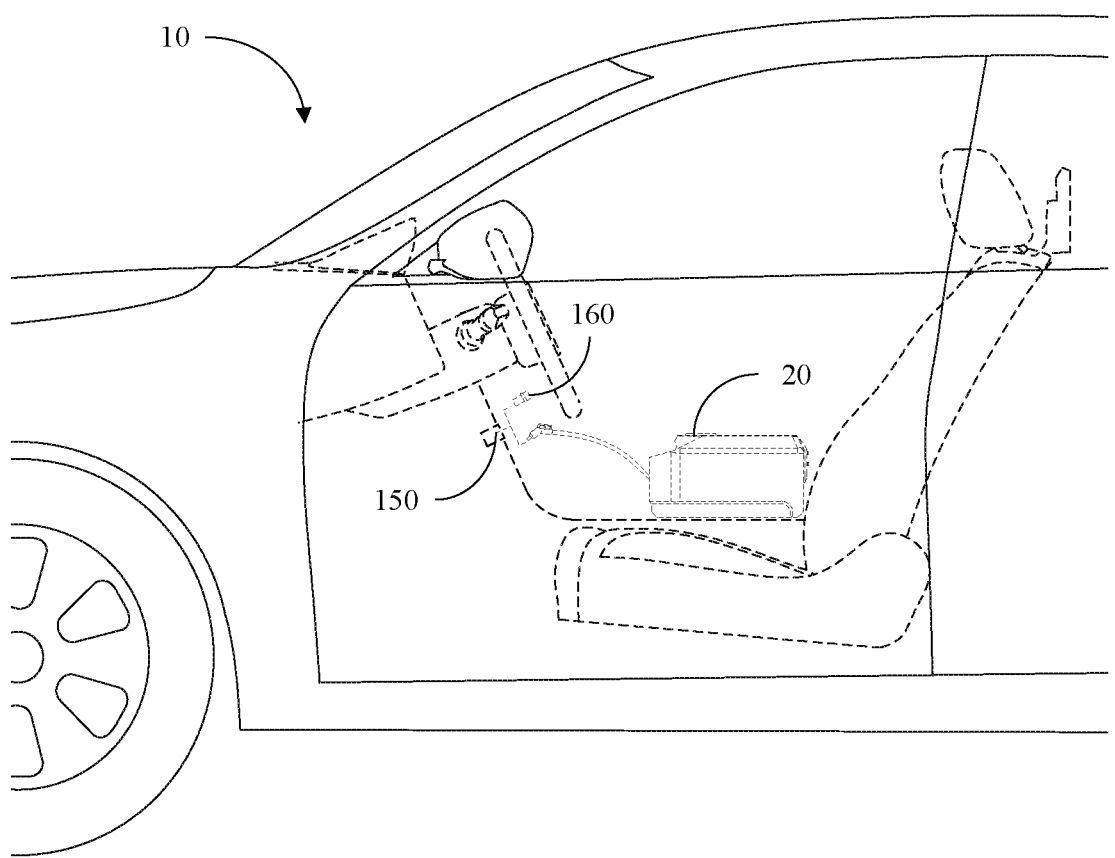
FIG. 5 is a schematic diagram of starting a vehicle by using an emergency power supply according to an embodiment of this application.

FIG. 5 is a schematic diagram of starting the vehicle 10 by using the external power supply 20 according to an embodiment of this application. As shown in FIG. 5, when the vehicle-mounted low voltage storage battery 110 of the vehicle 10 is in an insufficient voltage state, a vehicle door cannot be opened by using a remote control key, a fingerprint, or the like, and the vehicle 10 cannot be started. However, the vehicle door may be opened by using a mechanical key, to enter a cockpit of the vehicle 10.

A first electrical connector 150 is disposed in the cockpit, for example, on a center console. A cigarette lighter 160 of the vehicle 10 may be inserted into the first electrical connector 150 and electrically connected to the first electrical connector 150, that is, the first electrical connector 150 may be a reused cigarette lighter interface in the vehicle 10. Alternatively, the external power supply 20 in this embodiment of this application may be electrically connected to the first electrical connector 150, so that low voltage electricity for starting the vehicle 10 may be provided by the external power supply 20.

FIG. 6 is a schematic diagram of an electrical connection of the first electrical connector 150, and shows an electrical connection relationship between the first electrical connector 150 on the vehicle 10 and another apparatus in the vehicle 10 in FIG. 5. As shown in FIG. 6, by comparing with FIG. 2, the first electrical connector 150 is added in the vehicle 10 in FIG. 6. The first electrical connector 150 includes the first connection portion 151 and the switching unit 152. The first connection portion 151 includes two first power contacts 151a and one first signal contact 151b. The two first power contacts 151a are electrically connected to a low voltage bus 130 through a low voltage line. In this way, a vehicle-mounted low voltage storage battery 110 may output low voltage electricity by using the first electrical connector 150, and after being connected to the first electrical connector 150, the external power supply 20 may also provide low voltage electricity to the controller 140 through the first electrical connector 150.

The first connection portion 151 is electrically connected to the low voltage bus 130 through the switching unit 152. Specifically, the switching unit 152 is connected in series with a low voltage line between a positive electrode of the low voltage bus 130 and the first power contact 151a. The switching unit 152 includes the first circuit 152a, the second circuit 152b, and a switching switch 152c. After being connected in parallel, the first circuit 152a, the second circuit 152b, and the switching switch 152c are connected in series between the positive electrode of the low voltage bus 130 and the first power contact 151a. The switching switch 152c is configured to switch the first circuit 152a or the second circuit 152b, so that the first circuit 152a or the second circuit 152b is connected in series between a positive electrode of the vehicle-mounted low voltage storage battery 110 and the first power contact 151a.

A specific form of the switching switch 152c may be a single-pole double-throw switch shown in FIG. 6, or may be two switches that are respectively connected in series with the first circuit 152a and the second circuit 152b. The two switches respectively control the first circuit 152a and the second circuit 152b, so that the first circuit 152a or the second circuit 152b is connected in series between the positive electrode of the vehicle-mounted low voltage storage battery 110 and the first power contact 151a. This is not limited herein.

The first circuit 152a and the second circuit 152b may be any type of overload protectors such as an air switch and a fuse. Specifications of the first circuit 152a and the second circuit 152*b* are different, so that two current specifications of overload protection may be provided. The first circuit 152*a* may be disconnected when a flowing current exceeds the first current threshold, for example, the current exceeds 100 A. The second circuit 152*b* may be disconnected when the flowing current exceeds the second current threshold, for example, the current exceeds 10 A.

The first signal contact 151*b* may be connected to the switching switch 152*c* through a signal line. In this way, after a second electrical connector 260 of the external power supply 20 is inserted into the first electrical connector 150, the second electrical connector 260 may be connected to the switching switch 152*c* through the first signal contact 151*b*, so that a control signal can be sent to the switching switch 152*c*. Then, the switching switch 152*c* switches the first circuit 152*a* or the second circuit 152*b*, so that the first circuit or the second circuit is connected in series between the low voltage bus 130 and the first power contact 151*a*.

Figure 7:
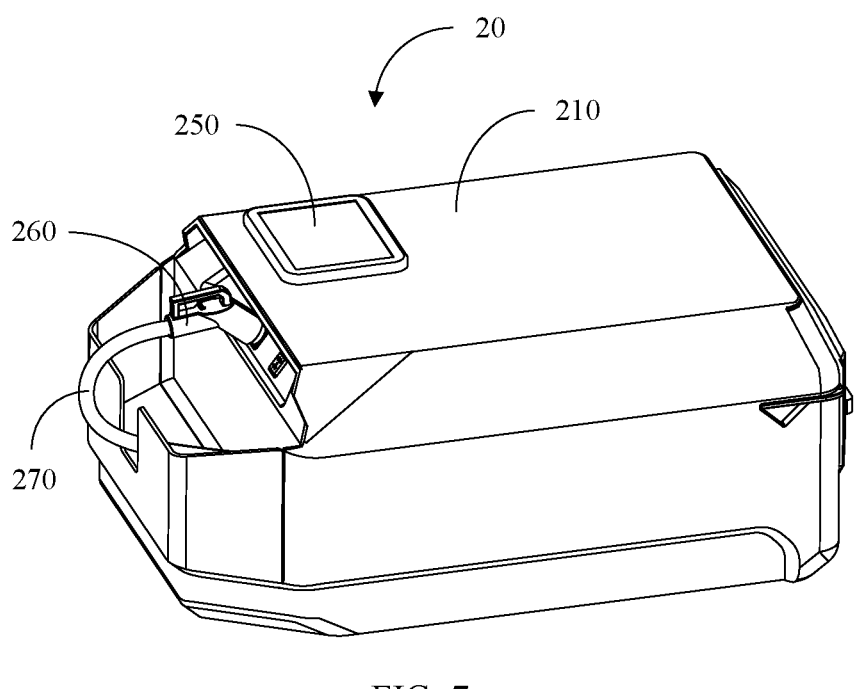
FIG. 7 is a schematic diagram of a structure of an emergency power supply according to an embodiment of this application.
Figure 8:
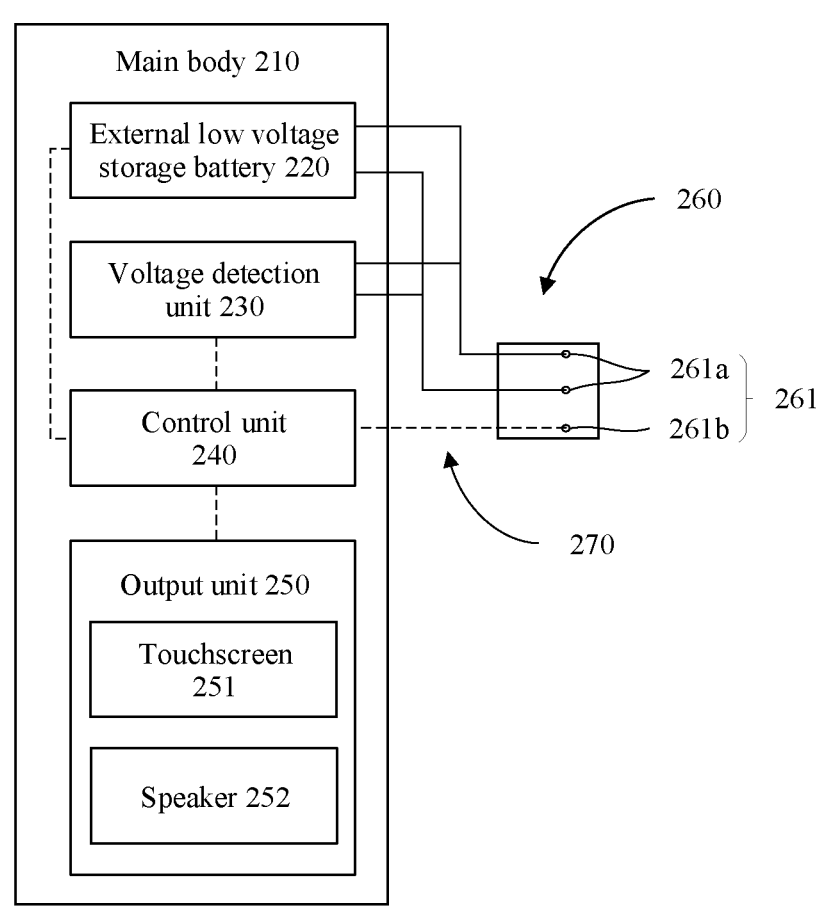
FIG. 8 is a schematic diagram of electrical connection in the emergency power supply in FIG. 7.

FIG. 7 is a schematic diagram of a structure of the external power supply 20 according to this embodiment of this application. FIG. 8 is a schematic diagram of electrical connection in the external power supply 20 in FIG. 7. As shown in FIG. 7 and FIG. 8, the external power supply 20 may include a main body 210, an external low voltage storage battery 220 (equivalent to a second battery), the voltage detection unit 230, the control unit 240, the output unit 250, the second electrical connector 260, and a first power supply line 270. The second electrical connector 260 has a second connection portion 261 (equivalent to a connection unit). A shape and a structure of the second connection portion 261 adapt to a shape and a structure of the first connection portion 151 of the first electrical connector 150. The second connection portion 261 may be inserted into the first connection portion 151, to implement a pluggable connection to the first connection portion 151. Two second power contacts 261*a* and one second signal contact 261*b* are disposed in the second connection portion 261. After the second connection portion 261 is inserted into the first connection portion 151, the second power contact 261*a* and the second signal contact 261*b* are correspondingly in contact with the first power contact 151*a* and the first signal contact 151*b*, to implement an electrical connection between the second connection portion 261 and the first connection portion 151.

The external low voltage storage battery 220, the voltage detection unit 230, the control unit 240, and the output unit 250 may be disposed in the main body 210. One end of the first power supply line 270 is connected to the main body 210, and the other end is connected to the second electrical connector 260. The first power supply line 270 may be fastened to or connected in a detachable manner to the main body 210 and the second electrical connector 260. A low voltage line and a signal line are disposed in the first power supply line 270, so that low voltage electricity may be transmitted through the low voltage line, and a control signal may be transmitted through the signal line. The external low voltage storage battery 220 is electrically connected to the two second power contacts 261*a* through a low voltage line, so that low voltage electricity can be transmitted to the controller 140 by using the second connection portion 261. The voltage detection unit 230 is electrically connected to the two second power contacts 261*a* in the second connection portion 261 through a low voltage line. The voltage detection unit 230 may be a device like a voltage sensor or a voltage detector, and is configured to detect a voltage between the two second power contacts 261*a*. The output unit 250 may be a device like a touchscreen 251 or a speaker 252 disposed on the main body 210, and may send prompt information in a form of a sound, a text, a picture, an animation, or the like. The control unit 240 is electrically connected to the external low voltage storage battery 220, the voltage detection unit 230, and the output unit 250 through signal lines, so that the control unit 240 may send a first control instruction to the external low voltage storage battery 220, the voltage detection unit 230, and the output unit 250, to control the external low voltage storage battery 220, the voltage detection unit 230, and the output unit 250 to work. The control unit 240 is further electrically connected to the second signal contact 261*b* in the second electrical connector 260 through a signal line, so that after being inserted into the first connection portion 151, the second connection portion 261 can be electrically connected to the switching switch 152*c*, to enable the control unit 240 to send a control instruction, to control the switching switch 152*c* to switch the first circuit 152*a* or the second circuit 152*b*, so that the first circuit or the second circuit is connected in series between the low voltage bus 130 and the first power contact 151*a* of the first connection portion 151.

Further, after the first electrical connector 150 is electrically connected to the second electrical connector 260, instruction information may be sent to the control unit 240 by operating the touchscreen 251 or a control button disposed on the main body 210, to indicate the control unit 240 to control the external low voltage storage battery 220 to output the low voltage electricity to the vehicle 10.

Further, after the first electrical connector 150 is electrically connected to the second electrical connector 260, the voltage detection unit 230 and the vehicle-mounted low voltage storage battery 110 form a circuit, and the voltage detection unit 230 may detect a voltage of the vehicle-mounted low voltage storage battery 110. The voltage detection unit 230 sends the detected voltage of the vehicle-mounted low voltage storage battery 110 to the control unit 240, and the control unit 240 may determine that the first electrical connector 150 is electrically connected to the second electrical connector 260. In addition, the control unit 240 may further consider the detected voltage of the vehicle-mounted low voltage storage battery 110 as indication information, and the indication information indicates the control unit 240 to control the external low voltage storage battery 220 to output the low voltage electricity to the vehicle 10.

Figure 9:
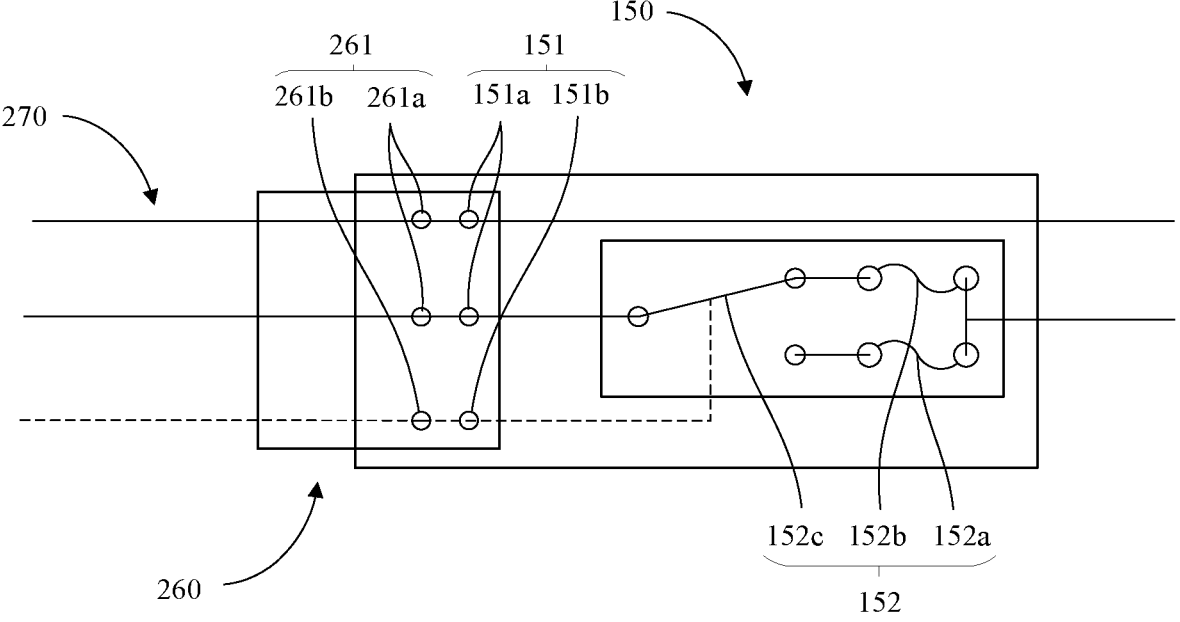
FIG. 9 is a schematic diagram of electrical connection between a second electrical connector and a first electrical connector.

FIG. 9 is a schematic diagram of electrical connection between the second electrical connector 260 and the first electrical connector 150 according to this an embodiment of this application. As shown in FIG. 9, the second connection portion 261 is inserted into the first connection portion 151, to enable the second electrical connector 260 to be electrically connected to the first electrical connector 150. In this case, the two first power contacts 151*a* are respectively electrically connected to the two second power contacts 261*a*, so that the external low voltage storage battery 220 may be electrically connected to the controller 140, and the voltage detection unit 230 may be electrically connected to the low voltage bus 130, to be further electrically connected to the vehicle-mounted low voltage storage battery 110 and the controller 140. The first signal contact 151*b* is electrically connected to the second signal contact 261*b*, so that the control unit 240 is electrically connected to the switching switch 152*c*.

In this way, the control unit 240 may control the voltage detection unit 230 to perform first voltage detection, to detect the voltage of the vehicle-mounted low voltage storage battery 110, and then determine a status of the vehicle-mounted low voltage storage battery 110. The control unit 240 may control the output unit 250 based on a detection result of the first voltage detection, to send first prompt information. During the first voltage detection, it is detected that when the voltage of the vehicle-mounted low voltage storage battery 110 is equal to or higher than the first voltage threshold, the first voltage threshold may be, for example, 9 V, and content of the first prompt information may be prompting that the vehicle-mounted low voltage storage battery 110 is in a normal state and can provide sufficient low voltage electricity for the controller 140. In this case, if the vehicle 10 cannot be started normally, it is prompted to check whether the vehicle 10 has another fault. During the first voltage detection, it is detected that when the voltage of the vehicle-mounted low voltage storage battery 110 is lower than the first voltage threshold, the content of the first prompt information may be prompting that the vehicle-mounted low voltage storage battery 110 is in an insufficient voltage state and cannot provide sufficient low voltage electricity for the controller 140. In this case, the control unit 240 may control the external low voltage storage battery 220 to provide low voltage electricity for the controller 140, so that the controller 140 can work normally.

After the controller 140 works normally, the vehicle-mounted high voltage storage battery 120 may be charged by using a charging pile. A DC/DC module in a PDU 142 may also convert high voltage electricity provided by the high voltage storage battery into low voltage electricity, for example, 13.5 V, to charge the vehicle-mounted low voltage storage battery 110, and further provide the low voltage electricity to the controller 140.

In this way, after the external low voltage storage battery 220 provides the low voltage electricity to the controller 140, the control unit 240 may control the voltage detection unit 230 to perform second voltage detection, to detect a voltage of the controller 140, and determine whether the controller 140 works normally. The control unit 240 may control the output unit 250 based on a detection result of the second voltage detection, to send second prompt information. During the second voltage detection, it is detected that when a voltage of the controller 140 is lower than the second voltage threshold, the second voltage threshold may be, for example, 13.5 V, and content of the second prompt information may be prompting that the vehicle 10 fails to be started; the PDU 142 fails to convert the high voltage electricity of the vehicle-mounted high voltage storage battery 120 into the low voltage electricity, fails to charge the vehicle-mounted low voltage storage battery 110, and fails to provide low voltage electricity for the controller 140 to work; and the vehicle 10 needs to be restarted. During the second voltage detection, it is detected that when the voltage of the controller 140 is equal to or higher than the second voltage threshold, the content of the second prompt information may be prompting that the vehicle 10 is successfully started, the vehicle-mounted high voltage storage battery 120 is providing electrical energy to charge the vehicle-mounted low voltage storage battery 110, and the controller 140 works normally.

The control unit 240 may further control the voltage detection unit 230 to perform third voltage detection, to detect a status of the external low voltage storage battery 220. The control unit 240 may control the output unit 250 based on a detection result of the third voltage detection, to send third prompt information. During the third voltage detection, it is detected that when a voltage of the external low voltage storage battery 220 is equal to or higher than the third voltage threshold, content of the third prompt information may be prompting that the external low voltage storage battery 220 is normal and can provide sufficient low voltage electricity for starting the vehicle 10. During the third voltage detection, it is detected that when the voltage of the external low voltage storage battery 220 is lower than the third voltage threshold, the content of the third prompt information may be prompting that the external low voltage storage battery 220 is in an insufficient voltage state and cannot provide sufficient low voltage electricity for starting the vehicle 10, and prompting to charge the external low voltage storage battery 220.

Further, after the vehicle 10 is started, the PDU 142 converts the high voltage electricity of the vehicle-mounted high voltage storage battery 120 into the low voltage electricity and transmits the low voltage electricity to the low voltage bus 130. The user may operate the touchscreen 251 or the control button, so that the control unit 240 may control the second connection portion 261 that is electrically connected to the low voltage bus 130 to obtain the low voltage electricity, to charge the external low voltage storage battery 220. In this way, when the user needs to use the external power supply to start the vehicle next time, the external low voltage storage battery 220 has sufficient electrical energy, to facilitate use by the user.

Further, after the vehicle 10 is started, the control unit 240 may directly control the second connection portion 261 that is electrically connected to the low voltage bus 130 to obtain the low voltage electricity, to charge the external low voltage storage battery 220.

Further, during the third voltage detection, it is detected that when the voltage of the external low voltage storage battery 220 is equal to or higher than the third voltage threshold, the control unit 240 may further determine power of the external low voltage storage battery 220 based on the detection result of the third voltage detection, and calculate, based on the power of the external low voltage storage battery 220 and power for starting the vehicle 10, a quantity of times that the vehicle 10 may be started. In this way, the content of the third prompt information may also be prompting the quantity of times that the external low voltage storage battery 220 may start the vehicle 10.

Before controlling the external low voltage storage battery 220 to transmit the low voltage electricity to the controller 140, the control unit 240 may control the switching switch 152c to serially connect the first circuit 152a between the controller 140 and the first power contact 151a, to prevent the controller 140 from being damaged by an excessively large current transmitted by the external low voltage storage battery 220 to the controller 140.

After controlling the external low voltage storage battery 220 to transmit the low voltage electricity to the controller 140, the control unit 240 may further control the switching switch 152c to serially connect the second circuit 152b between the vehicle-mounted low voltage storage battery 110 and the first power contact 151a, to prevent, after a second connector like the cigarette lighter 160 is inserted into the first electrical connector 150, the controller 140 from being is damaged by an excessively large current transmitted by the vehicle-mounted low voltage storage battery 110 to the second connector.

An embodiment of this application further provides another external power supply 20 and the vehicle 10, so that the external power supply 20 can be conveniently connected to the vehicle 10 and provide low voltage electricity for starting the vehicle 10.

Figure 10:
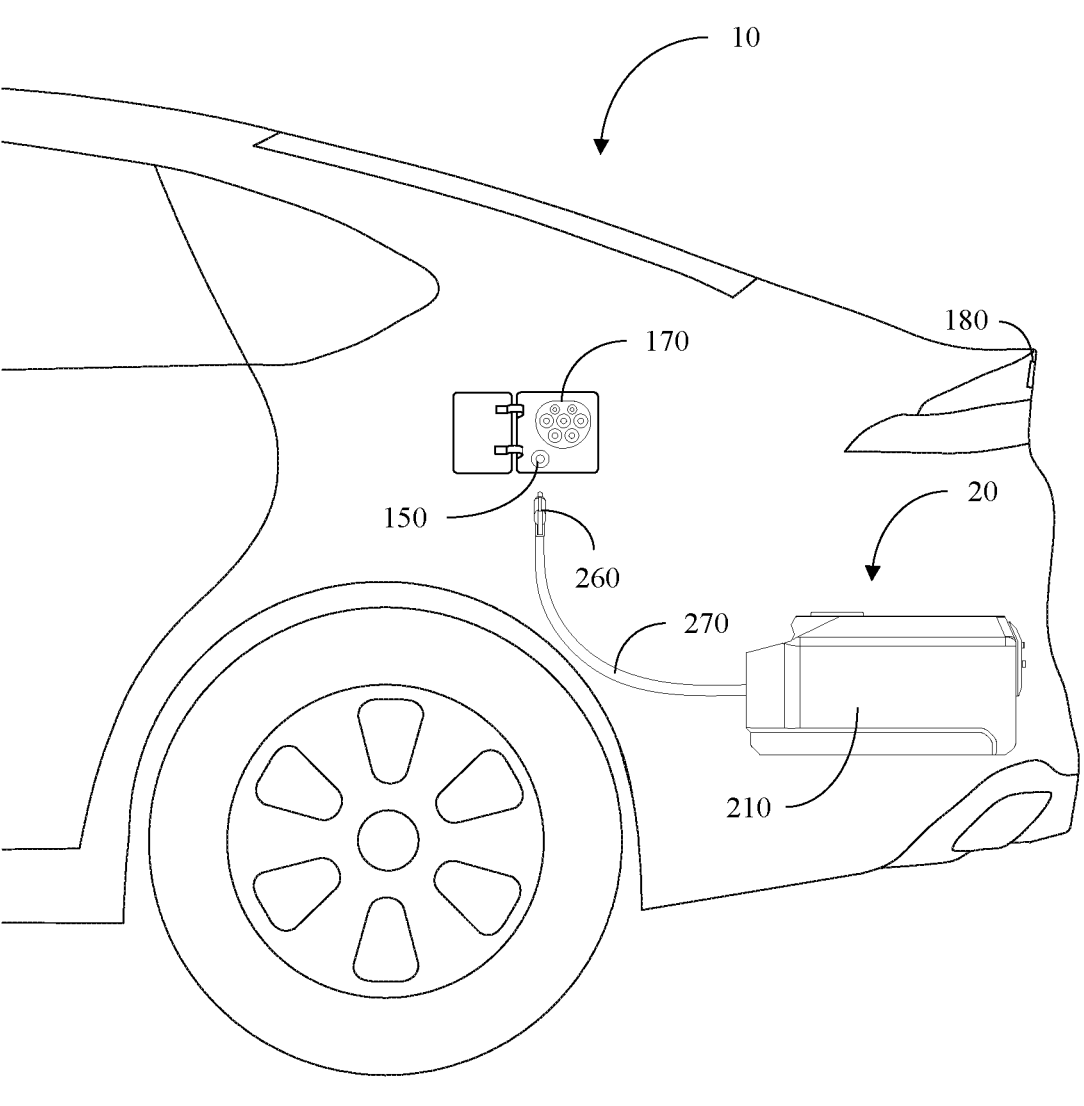
FIG. 10 is a schematic diagram of starting a vehicle by using another emergency power supply according to an embodiment of this application.

FIG. 10 is a schematic diagram of starting the vehicle 10 by using the another external power supply 20 according to this embodiment of this application. As shown in FIG. 10, when the vehicle-mounted low voltage storage battery 110 of the vehicle 10 in an insufficient voltage state, a vehicle door cannot be opened by using a remote control key, a fingerprint, or the like, and the vehicle 10 cannot be started. The first electrical connector 150 is disposed outside the vehicle 10, for example, at a position of a front or rear vehicle logo 180 of the vehicle 10 or a position adjacent to the charging interface 170 used to charge the vehicle-mounted high voltage storage battery 120. The first electrical connector 150 may be hidden at a position covered by the front or rear vehicle logo 180, or disposed at the position adjacent to the charging interface 170 of the vehicle 10, and is covered and hidden by a cover plate of the charging interface 170. In this embodiment of this application, the external power supply 20 may be connected to the first electrical connector 150, so that the low voltage electricity for starting the vehicle 10 may be provided by the external power supply 20.

Figure 11:
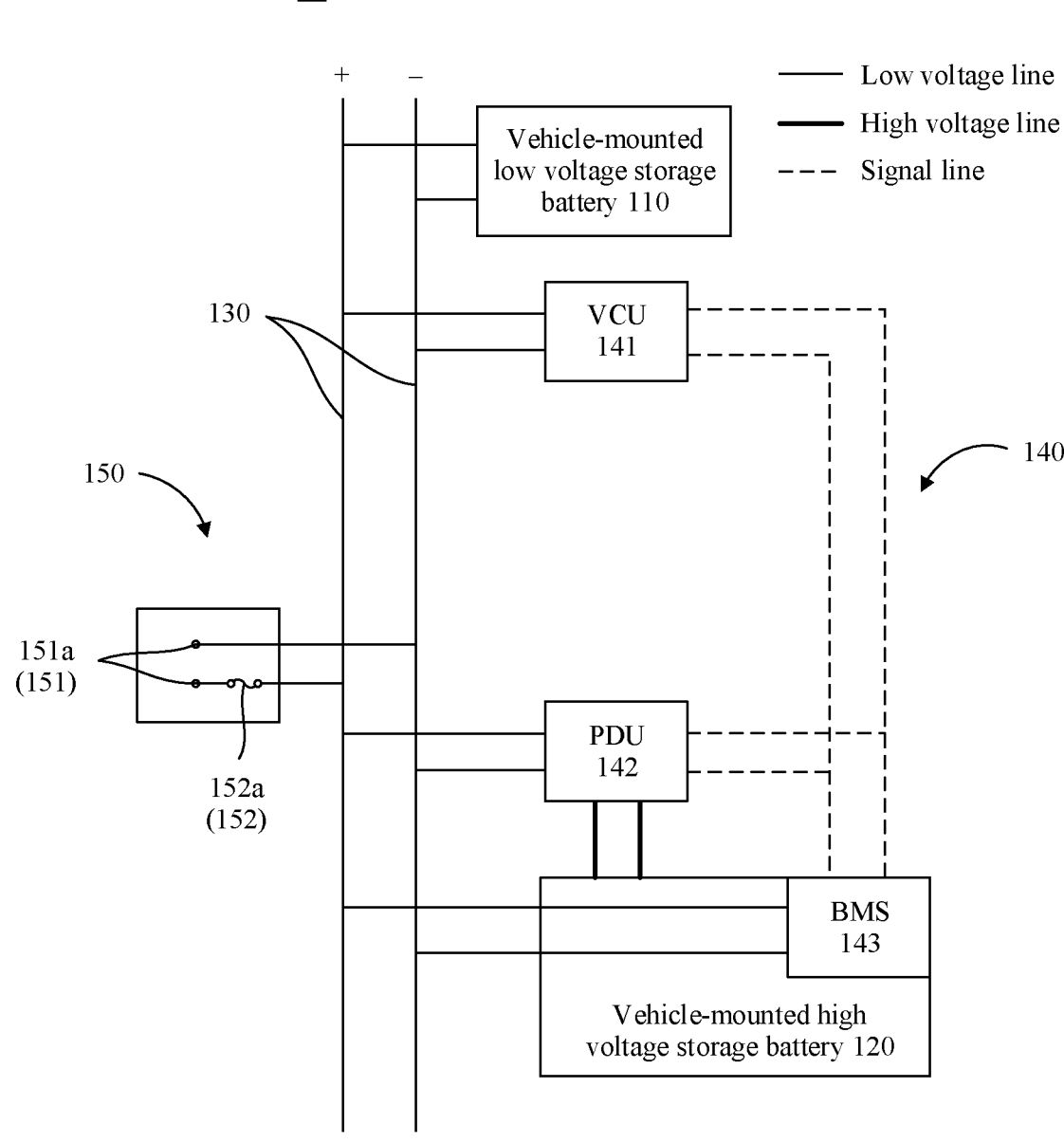
FIG. 11 is a schematic diagram of electrical connection of a first electrical connector.

FIG. 11 is a schematic diagram of an electrical connection of the first electrical connector 150, and shows an electrical connection relationship between the first electrical connector 150 on the vehicle 10 and another apparatus in the vehicle 10 in FIG. 10. As shown in FIG. 11, the first electrical connector 150 includes the first connection portion 151 and the switching unit 152. The two first power contacts 151a are disposed in the first connection portion 151, and the two first power contacts 151a are electrically connected to the low voltage bus 130 through a low voltage line. The switching unit 152 includes the first circuit 152a. The first circuit 152a is connected in series between the positive electrode of the low voltage bus 130 and the first power contact 151a. The first circuit 152a may be an air switch or a fuse. When a current passing through the first circuit 152a exceeds the third current threshold, for example, 100 A, the first circuit 152a is disconnected.

Figure 12:
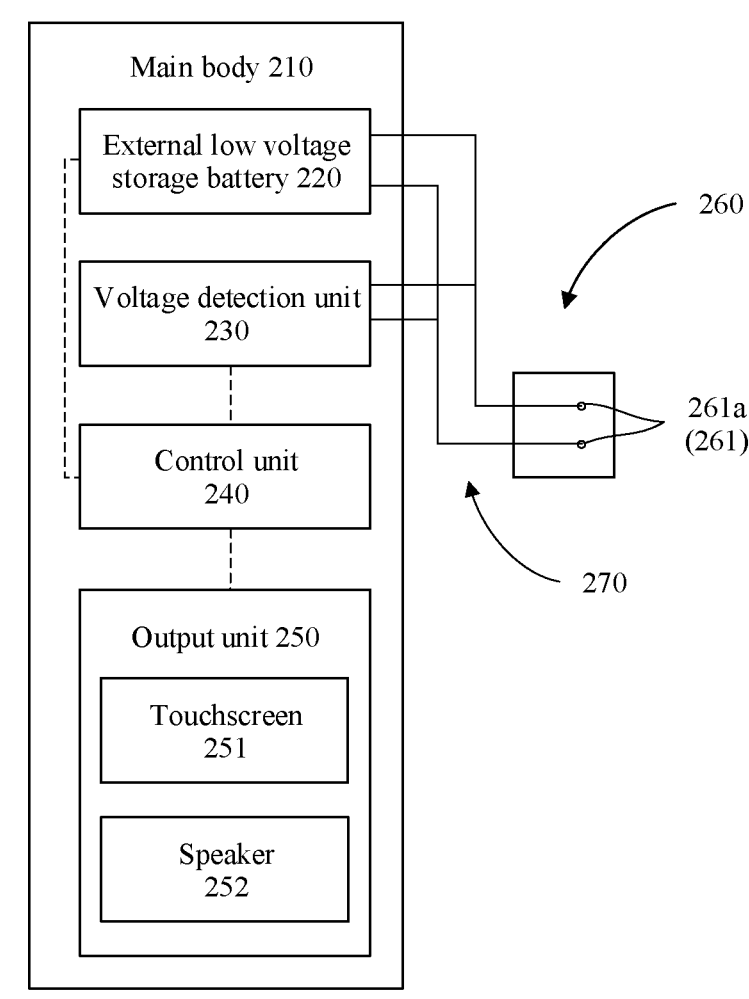
FIG. 12 is a schematic diagram of electrical connection in an emergency power supply.

FIG. 12 is a schematic diagram of electrical connection in the external power supply 20, and shows an electrical connection relationship of the apparatuses in the external power supply 20 in FIG. 10. As shown in FIG. 12, the external power supply 20 may include the main body 210, the external low voltage storage battery 220, the voltage detection unit 230, the control unit 240, the output unit 250, the second electrical connector 260, and a second power supply line 270. One end of the second power supply line 270 is connected to the main body 210, and the other end is connected to the second electrical connector 260. The second power supply line 270 may be fastened to or connected in a detachable manner to the main body 210 and the second electrical connector 260. A low voltage line is disposed in the second power supply line 270, and low voltage electricity may be transmitted through the low voltage line. The voltage detection unit 230, the control unit 240, and the output unit 250 are disposed in the main body 210. The second electrical connector 260 has the second connection portion 261. A shape and a structure of the second connection portion 261 adapt to a shape and a structure of the first connection portion 151. The second connection portion 261 may be inserted into the first connection portion 151, to implement a pluggable connection to the first connection portion 151. The two second power contacts 261a are disposed in the second connection portion 261. After the second connection portion 261 is inserted into the first connection portion 151, the two second power contacts 261a are respectively in contact with the two first power contacts 151a, to implement an electrical connection between the second electrical connector 260 and the first electrical connector 150.

The external low voltage storage battery 220 may be disposed in the main body 210, and the external low voltage storage battery 220 is electrically connected to the two second power contacts 261a through the low voltage line, so that low voltage electricity can be transmitted to the controller 140 by using the second electrical connector 260. The voltage detection unit 230 is electrically connected to the two second power contacts 261a in the second connection portion 261 through the low voltage line. The voltage detection unit 230 may be a device like a voltage sensor or a voltage detector, and is configured to detect a voltage between the two second power contacts 261a. The output unit 250 may be a device like the touchscreen 251 or the speaker 252 disposed on the second electrical connector 260, and may send prompt information in a form of a sound, a text, a picture, an animation, or the like. The control unit 240 is electrically connected to the external low voltage storage battery 220, the voltage detection unit 230, and the output unit 250 through the signal line, so that the control unit 240 may send a first control instruction to the external low voltage storage battery 220, the voltage detection unit 230, and the output unit 250, to control the external low voltage storage battery 220, the voltage detection unit 230, and the output unit 250 to work.

Figure 13:
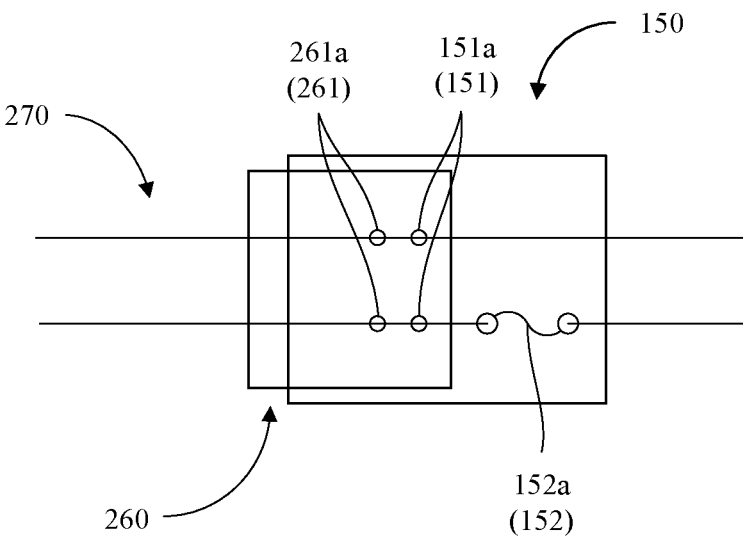
FIG. 13 is a schematic diagram of electrical connection between a second electrical connector and a first electrical connector.

FIG. 13 is a schematic diagram of electrical connection between the second electrical connector 260 and the first electrical connector 150, and shows an electrical connection relationship between the first electrical connector in FIG. 11 and the second electrical connector in FIG. 12. As shown in FIG. 13, the second connection portion 261 is inserted into the first connection portion 151, to enable the second electrical connector 260 to be electrically connected to the first electrical connector 150. In this case, the two first power contacts 151a are respectively electrically connected to the two second power contacts 261a, so that the external low voltage storage battery 220 may be electrically connected to the low voltage bus 130, and the voltage detection unit 230 may be electrically connected to the vehicle-mounted low voltage storage battery 110 and the controller 140. In this way, the external low voltage storage battery 220 may be controlled to provide the low voltage electricity to the controller 140, so that the controller 140 can work normally, the voltage detection unit 230 may be controlled to perform first voltage detection, second voltage detection, and third voltage detection, and the output unit 250 may be controlled to send first prompt information, second prompt information, and third prompt information. For a specific implementation, refer to the foregoing embodiments. A specific way is not described herein again.

Further, the first electrical connector 150 may further reuse the charging interface 170, so that a quantity of interfaces may be reduced, production costs may be reduced, and a user operation may be facilitated.

Further, the first electrical connector 150 may be a separate interface, or may reuse an existing interface on the vehicle 10. The first electrical connector 150 may be visible, or may be invisible after being covered by a cover. Alternatively, the first electrical connector 150 may be disposed on a surface of a vehicle body, or may be disposed on a surface of an interior in a cockpit.

Further, the voltage detection unit 230, the control unit 240, and the output unit 250 may be further disposed in the second electrical connector 260. This is not limited herein.

An embodiment of this application further provides a method for controlling the external power supply 20. The external power supply 20 may be controlled to provide low voltage electricity for starting the vehicle 10.

Figure 14A:
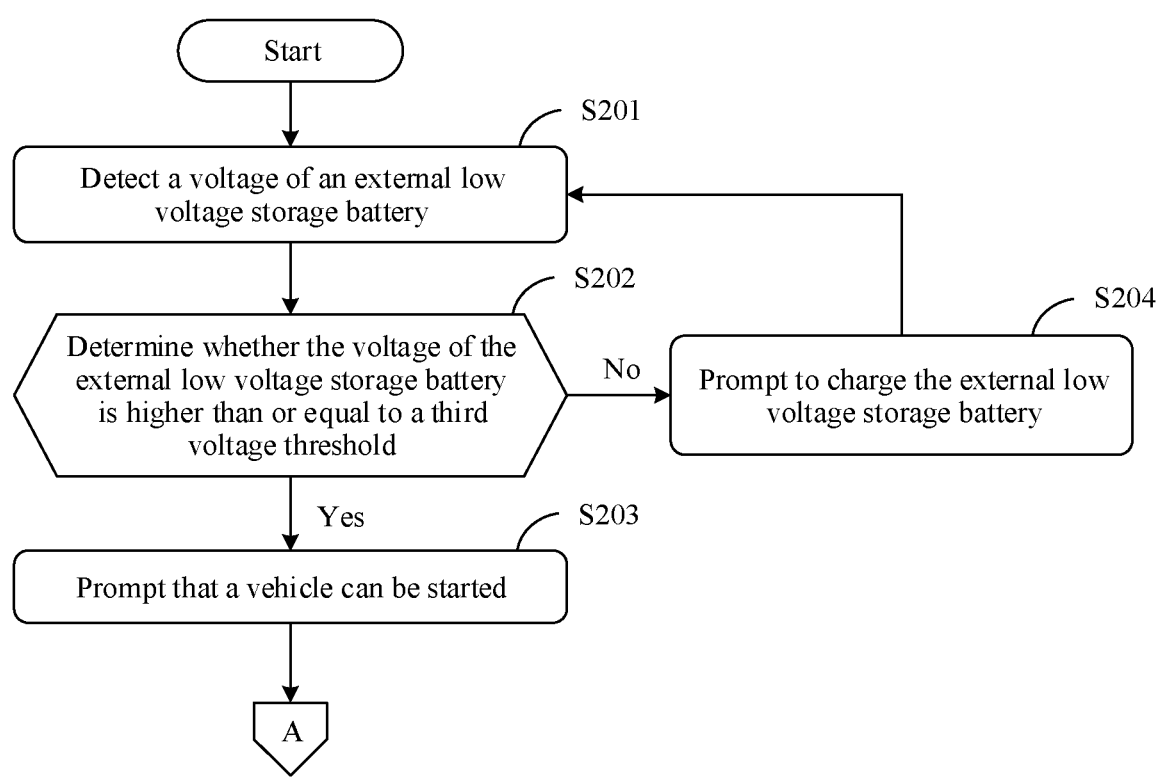
FIG. 14A is a part of flowchart of a method for controlling an emergency power supply according to an embodiment of this application.
Figures 1, 14B:
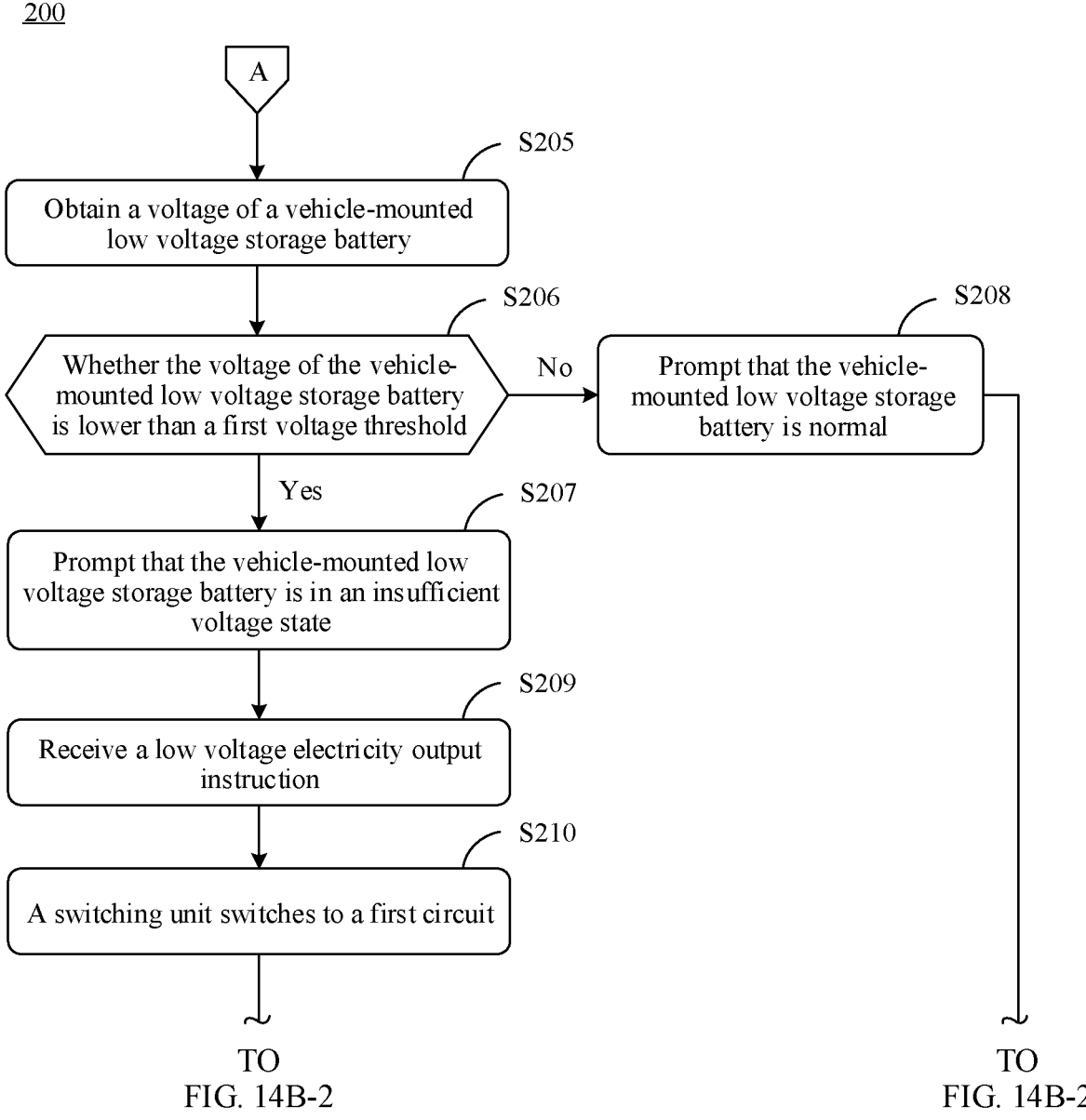
Figures 2, 14B:
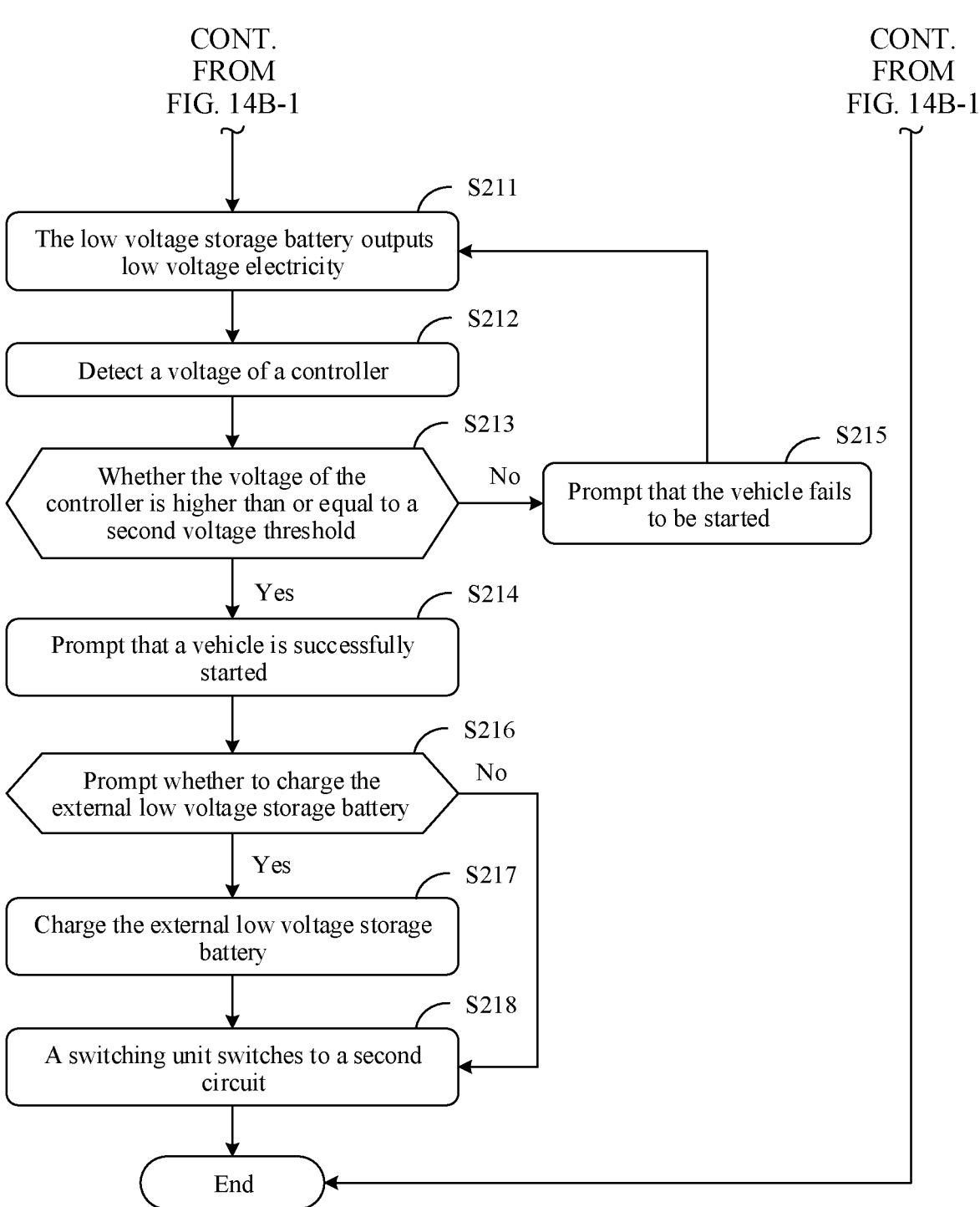

FIG. 14A is a part of flowchart of a method 200 for controlling the external power supply 20 according to an embodiment of this application; and FIG. 14B-1 and FIG. 14B-2 are the other part of flowchart of the method 200 for controlling the external power supply 20 according to this embodiment of this application. As shown in FIG. 14A, FIG. 14B-1, and FIG. 14B-2, the method 200 for controlling the external power supply 20 specifically includes the following steps.

Step S201: Perform third voltage detection to detect a voltage of the external low voltage storage battery 220.

The control unit 240 controls the voltage detection unit 230 to perform third voltage detection, and detects the voltage of the external low voltage storage battery 220 in the external power supply 20, to obtain voltage data of the external low voltage storage battery 220. The voltage detection unit 230 may send a detection result to the control unit 240, and the control unit 240 may calculate power of the external low voltage storage battery 220 based on the detection result.

Step S202: Determine whether the voltage of the external low voltage storage battery 220 is higher than or equal to the third voltage threshold.

The power of the external low voltage storage battery 220 is calculated based on the voltage of the external low voltage storage battery 220. Therefore, based on power for starting the vehicle 10, it may be determined that when the voltage of the external low voltage storage battery 220 is higher than or equal to the third voltage threshold, sufficient power for starting the vehicle 10 may be provided, and it may also determine the quantity of times that the power of the external low voltage storage battery 220 may start the vehicle 10. When the voltage of the external low voltage storage battery 220 is lower than the third voltage threshold, it may be determined that the external low voltage storage battery 220 is in an insufficient voltage state and cannot provide sufficient low voltage electricity for starting the vehicle 10.

Step S203: Prompt that the vehicle 10 can be started.

The control unit 240 controls the output unit 250 to send the third prompt information. The third prompt information includes: When the voltage of the external low voltage storage battery 220 is higher than or equal to the third voltage threshold, it is prompted that the external low voltage storage battery 220 may provide sufficient electrical energy for starting the vehicle 10 and prompted that the vehicle 10 can be started.

The output unit 250 may send the prompt information by using a device like the touchscreen 251 or the speaker 252 disposed on the external power supply 20, and may send the prompt information in a form of a sound, a text, a picture, an animation, or the like. In this way, a user can learn a status of the external power supply 20 in a timely manner, to facilitate use.

Further, the output unit 250 may further prompt the quantity of times that the vehicle 10 is started by using the external power supply 20. In this way, the user can clearly understand the status of the external power supply 20, to facilitate use by the user.

Step S204: Prompt to charge the external low voltage storage battery 220.

The third prompt information further includes: When the voltage of the external low voltage storage battery 220 is lower than the third voltage threshold, the external low voltage storage battery 220 cannot provide the sufficient electrical energy for starting the vehicle 10. In addition, the external low voltage storage battery 220 is in the insufficient voltage state, the user is prompted to charge the external low voltage storage battery 220. In this way, the user may charge the external power supply 20 by using a charging device that adapts to the external power supply 20.

Step S205: Perform first voltage detection to detect the voltage of the vehicle-mounted low voltage storage battery 110.

When the second connection portion 261 is inserted into the first connection portion 151, and the first electrical connector 150 is electrically connected to the second electrical connector 260, an electrical connection between the voltage detection unit 230 and the vehicle-mounted low voltage storage battery 110 is implemented to form a circuit, and the voltage detection unit 230 may obtain the voltage of the vehicle-mounted low voltage storage battery 110. In this way, the control unit 240 can determine that the first electrical connector 150 is electrically connected to the second electrical connector 260, and may further determine a status of the vehicle-mounted low voltage storage battery 110 based on the obtained voltage of the vehicle-mounted low voltage storage battery 110.

Step S206: Determine whether the voltage of the vehicle-mounted low voltage storage battery 110 is lower than the first voltage threshold.

When the voltage of the vehicle-mounted low voltage storage battery 110 is lower than the first voltage threshold, the vehicle-mounted low voltage storage battery 110 is in an insufficient voltage state; and when the voltage of the vehicle-mounted low voltage storage battery 110 is equal to or higher than the first voltage threshold, the vehicle-mounted low voltage storage battery 110 is in a normal state, and the vehicle 10 cannot be started normally due to another fault.

Step S207: Prompt that the vehicle-mounted low voltage storage battery 110 is in the insufficient voltage state.

The control unit 240 controls the output unit 250 to send first prompt information. The first prompt information includes: When the voltage of the vehicle-mounted low voltage storage battery 110 is lower than the first voltage threshold, it is prompted that the vehicle-mounted low voltage storage battery 110 is in the insufficient voltage state and the external power supply 20 needs to provide the low voltage electricity, to start the vehicle 10.

Step S208: Prompt that the vehicle-mounted low voltage storage battery 110 is normal.

The first prompt information further includes: When the voltage of the vehicle-mounted low voltage storage battery 110 is equal to or higher than the first voltage threshold, it is prompted that the vehicle-mounted low voltage storage battery 110 is in the normal state, the vehicle 10 cannot be started normally due to the another fault and prompted that the user checks the another fault.

Step S209: Receive a low voltage output instruction.

The user may send instruction information for outputting the low voltage electricity by tapping a button on the touchscreen 251, tapping a physical button on the external power supply 20, or by a method like voice control, gesture control, or remote terminal control. The control unit 240 may receive the instruction information.

Alternatively, when detecting that the second electrical connector 260 is inserted into the first electrical connector 150, the voltage detection unit 230 obtains the voltage of the vehicle-mounted low voltage storage battery 110. When the voltage of the vehicle-mounted low voltage storage battery 110 is lower than the first voltage threshold, the control unit 240 may consider receiving the instruction information for outputting the low voltage electricity.

Step S210: The switching unit 152 switches to the first circuit 152a.

Before the external low voltage storage battery 220 outputs the low voltage electricity, the control unit 240 controls the switching switch 152c in the switching unit 152 to perform switching, so that the first circuit 152a is connected in series between the external low voltage storage battery 220 and the controller 140. In this way, when the external low voltage storage battery 220 provides the low voltage electricity to the controller 140, overload protection may be provided. That is, when a current transmitted to the controller 140 is excessively large, for example, higher than 100 A, the first circuit 152a is fused, to disconnect the external low voltage storage battery 220 from the controller 140. This avoids damage to the controller 140 caused by the excessively large current.

Step S211: The external low voltage storage battery 220 outputs the low voltage electricity.

The control unit 240 sends a first control instruction after receiving the instruction information for outputting the low voltage electricity, and controls the external low voltage storage battery 220 to output the low voltage electricity, to provide the electrical energy for the controller 140.

Step S212: Perform second voltage detection to detect the voltage of the controller 140.

The control unit 240 controls the voltage detection unit 230 to perform second voltage detection, to detect the voltage of the controller 140. The voltage detection unit 230 sends a detection result to the control unit 240, and the control unit 240 may determine a status of the controller 140 based on the detection result.

Step S213: Determine whether the voltage of the controller 140 is higher than or equal to the second voltage threshold.

The control unit 240 may determine the status of the controller 140 based on the detection result. When the voltage of the controller 140 is higher than or equal to the second voltage threshold in the detection result, it indicates that the vehicle-mounted high voltage storage battery 120 converts high voltage electricity into the low voltage electricity under control of the controller 140, to charge the vehicle-mounted low voltage storage battery 110 and provide the low voltage electricity to the controller 140. This also indicates that the vehicle 10 is successfully started.

When the voltage of the controller 140 is lower than the second voltage threshold in the detection result, it indicates that the controller 140 does not control the vehicle-mounted high voltage storage battery 120 to convert the high voltage electricity into the low voltage electricity. This indicates that the vehicle 10 fails to be started.

Step S214: Prompt that the vehicle 10 is successfully started.

The control unit 240 controls the output unit 250 to send second prompt information. The second prompt information includes: When the voltage of the controller 140 is higher than or equal to the second voltage threshold in the detection result, it is prompted that the vehicle 10 is successfully started. In this case, the vehicle-mounted high voltage storage battery 120 converts the high voltage electricity into the low voltage electricity under control of the controller 140, to charge the vehicle-mounted low voltage storage battery 110 and provide the low voltage electricity to the controller 140, and it is prompted that the second electrical connector 260 or the second electrical connector 260 may be unplugged from the first electrical connector 150 or the first electrical connector 150.

Step S215: Prompt that the vehicle 10 fails to be started.

The second prompt information further includes: When the detection result shows that the voltage of the controller 140 is lower than the second voltage threshold, it is prompted that the vehicle 10 fails to be started. In this case, the vehicle-mounted high voltage storage battery 120 does not convert the high voltage electricity into the low voltage electricity under the control of the controller 140, and the vehicle-mounted high voltage storage battery 120 fails to charge the vehicle-mounted low voltage storage battery 110 and provide the low voltage electricity for the controller 140. The control unit 240 controls the external low voltage storage battery 220 to output the low voltage electricity again, to provide the electrical energy for starting the vehicle 10.

Step S216: Prompt whether to charge the external low voltage storage battery 220.

The second prompt information further includes: When the voltage of the controller 140 in the detection result is higher than or equal to the second voltage threshold, the user is prompted whether to charge the external low voltage storage battery 220.

Step S217: Charge the external low voltage storage battery 220.

When the user selects to charge the external low voltage storage battery 220, the control unit 240 may control the external power supply 20 to obtain the low voltage electricity of the vehicle 10 by using the second connection portion 261, to charge the external low voltage storage battery 220.

Alternatively, during the third voltage detection, when the voltage of the external low voltage storage battery 220 is lower than a fourth voltage threshold, the control unit 240 may control the external power supply 20 to obtain the low voltage electricity of the vehicle 10 by using the second connection portion 261, to charge the external low voltage storage battery 220.

Step S218: The switching unit 152 switches to the second circuit 152b.

After the vehicle 10 is successfully started, the control unit 240 controls the switching switch 152c in the switching unit 152 to perform switching, so that the second circuit 152b is connected in series between the low voltage bus 130 and the first connection portion 151. In this way, when the cigarette lighter 160 or another apparatus is inserted into the first electrical connector 150 and the vehicle-mounted low voltage storage battery 110 provides the low voltage electricity to the cigarette lighter 160 or the another apparatus by using the first electrical connector 150, overload protection may be provided. That is, when a current transmitted to the cigarette lighter 160 or the another apparatus is excessively large, for example, higher than 10 A, the second circuit 152b is disconnected to avoid damage to the cigarette lighter 160 or the another apparatus caused by the excessively large current.

To sum up, when the vehicle 10 is in the insufficient voltage state, the second electrical connector 260 or the second electrical connector 260 may be inserted into the first electrical connector 150 or the first electrical connector 150 on the vehicle 10, and the control unit 240 may control the external low voltage storage battery 220 in the external power supply 20 to provide the low voltage electricity to the controller 140 in the vehicle 10, to start the vehicle 10.

Figure 15:
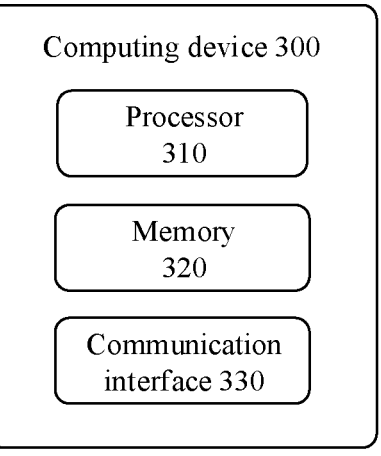
FIG. 15 is a schematic diagram of a structure of a computing device according to an embodiment of this application.

FIG. 15 is a schematic diagram of a structure of a computing device 300 according to an embodiment of this application. The computing device 300 includes a processor 310, a memory 320, and a communication interface 330.

It should be understood that the communication interface 330 in the computing device 300 shown in FIG. 15 may be used to communicate with another device.

The processor 310 may be connected to the memory 320. The memory 320 may be configured to store program code and data. Therefore, the memory 320 may be a storage apparatus in the processor 310, may be an external storage apparatus independent of the processor 310, or may be a component including a storage apparatus in the processor 310 and an external storage apparatus independent of the processor 310.

It should be understood that, in this embodiment of this application, the processor 310 may be a central processing unit (CPU). The processor may be alternatively a general-purpose processor, a digital signal processor (DSP), an application-specific integrated circuit (ASIC), a field programmable gate array (FPGA) or another programmable logical device, a discrete gate or transistor logic device, or a discrete hardware component. The general-purpose processor may be a microprocessor, or the processor may be any conventional processor or the like. Alternatively, the processor 310 is configured to execute a related program through one or more integrated circuits, to implement the technical solutions provided in embodiments of this application.

The memory 320 may include a read-only memory and a random access memory, and provides instructions and data for the processor 310. A part of the processor 310 may further include a non-volatile random access memory. For example, the processor 310 may further store information about a device type.

When the computing device 300 runs, the processor 310 executes computer-executable instructions in the memory 320 to perform the operation steps of the foregoing method.

It should be understood that the computing device 300 in this embodiment of this application may correspond to a corresponding execution body of the method according to embodiments of this application, and the foregoing and other operations and/or functions of the modules in the computing device 300 are separately intended to implement corresponding procedures of the methods in embodiments. For brevity, details are not described herein again.

A person of ordinary skill in the art may recognize that, with reference to the examples described in embodiments disclosed herein, apparatuses and algorithm steps may be implemented by electronic hardware or a combination of computer software and electronic hardware. Whether these functions are implemented by hardware or software depends on specific applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a specific working process of the above described system, apparatus, and device, reference may be made to a corresponding process in the foregoing method embodiments. Details are not described herein again.

In some embodiments provided in this application, it should be understood that the disclosed system, apparatus, and method may be implemented in another manner. For example, the described apparatus embodiment is only an example. For example, the apparatus division is merely logical function division. In actual implementation, there may be another division manner. For example, a plurality of apparatuses or components may be combined or integrated into another system, or some features may be ignored or not performed. In addition, the displayed or discussed mutual couplings or direct couplings or communication connections may be implemented through some interfaces. The indirect couplings or communication connections between the apparatuses may be implemented in electronic, mechanical, or other forms.

The apparatuses described as separate parts may or may not be physically separate, and parts displayed as apparatuses may or may not be physical apparatuses, that is, may be located in one place, or may be distributed on a plurality of network apparatuses. Some or all of the apparatuses may be selected based on an actual requirement to implement the objectives of the solutions in embodiments.

In addition, functional apparatuses in embodiments of this application may be integrated into one processing apparatus, or each of the apparatuses may exist alone physically, or two or more apparatuses are integrated into one apparatus.

If the function is implemented in a form of software functional apparatuses and sold or used as independent products, the function may be stored in a computer-readable storage medium. Based on such an understanding, the technical solutions of this application essentially or the part contributing to an existing technology or a part of the technical solutions may be implemented in a form of a software product. The computer software product is stored in a storage medium and includes several instructions for instructing a computer device (which may be a personal computer, a server, a network device, or the like) to perform all or some steps in the methods described in embodiments of this application. The foregoing storage medium includes any medium that can store program code, such as a USB flash drive, a removable hard disk, a read-only memory (ROM), a random access memory (RAM), a magnetic disk, or an optical disc.

An embodiment of this application further provides a computer-readable storage medium. The computer-readable storage medium stores a computer program, and when the program is executed by a processor, the program is used to perform a diversity problem generation method. The method includes at least one of the solutions described in the foregoing embodiments.

The computer storage medium according to this embodiment of this application may be any combination of one or more computer-readable media. The computer-readable medium may be a computer-readable signal medium or a computer-readable storage medium. The computer-readable storage medium may be but is not limited to an electric, magnetic, optical, electromagnetic, infrared, or semiconductor system, apparatus, or device, or any combination thereof. More specific examples (a non-exhaustive list) of the computer-readable storage medium include a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In this document, the computer-readable storage medium may be any tangible medium including or storing a program that may be used by an instruction execution system, apparatus, or device, or be used in combination with an instruction execution system, apparatus, or device.

The computer-readable signal medium may include a data signal propagated in a baseband or propagated as a part of a carrier, where the data signal carries computer-readable program code. Such propagated data signal may take a variety of forms, including but not limited to an electromagnetic signal, an optical signal, or any suitable combination thereof. The computer-readable signal medium may alternatively be any computer-readable medium other than the computer-readable storage medium. The computer-readable medium may send, propagate, or transmit the program used by the instruction execution system, apparatus, or device, or used in combination with the instruction execution system, apparatus, or device.

The program code included in the computer-readable medium may be transmitted through any suitable medium, including but not limited to wireless medium, a wire, an optical cable, RF, and the like, or any suitable combination thereof.

Computer program code for performing the operations in this application may be written in one or more programming languages or a combination thereof. The programming language includes an object-oriented programming language, like Java, Smalltalk, and C++, and also includes a conventional procedural programming language, like a "C" language or a similar programming language. The program code may be entirely executed on a user computer, partially executed on a user computer, executed as a separate software package, partially executed on a user computer while the program code is partially executed on a remote computer, or entirely executed on a remote computer or a server. In a case in which the remote computer is involved, the remote computer may be connected to the user computer through any type of network, including a local area network (LAN) or a wide area network (WAN). Alternatively, the remote computer may be connected to an external computer (for example, connected by an internet service provider through an internet).

It should be noted that the foregoing is only exemplary embodiments of this application and used technical principles. A person skilled in the art may understand that this application is not limited to specific embodiments described herein, and a person skilled in the art may make various obvious changes, readjustments, and replacements without departing from the protection scope of this application. Therefore, although this application is described in detail with reference to the foregoing embodiments, this application is not limited to the foregoing embodiments. More other equivalent embodiments may be included without departing from the concept of this application, and all fall within the protection scope of this application.

What is claimed is:

1. A vehicle, comprising:
a first battery, wherein the first battery is connected to at least one controller of the vehicle;
a connection portion, wherein the connection portion is a cigarette lighter interface of the vehicle connected to the first battery and the at least one controller, and the connection portion is further configured to be connected to an external power supply; and
a switching circuit, wherein:
the switching circuit is configured to switch to a first mode under a first condition, and wherein:
in the first mode, the switching circuit is configured to connect the connection portion to the at least one controller through a first circuit; and
the first condition comprises: a voltage of the first battery is lower than a first voltage threshold, or the switching circuit receives a first signal, and the first signal is used to control the switching circuit to work in the first mode; and
the switching circuit is configured to switch to a third mode under a third condition, and wherein:
in the third mode, the switching circuit is configured to enable the vehicle to supply power to the connection portion through a first circuit; and
the third condition comprises: the switching circuit receives a third signal, and the third signal is used to control the switching circuit to work in the third mode.

2. The vehicle according to claim 1, wherein the switching circuit is configured to switch to a second mode under a second condition, and wherein:
in the second mode, the switching circuit is configured to connect the connection portion to the first battery through a second circuit; and
the second condition comprises: a voltage of the first battery is higher than a second voltage threshold, or the switching circuit receives a second signal, and the second signal is used to control the switching circuit to work in the second mode.

3. A method for controlling a vehicle power system of a vehicle, wherein the vehicle comprises a first battery, at least one controller, a switching circuit, and a connection portion, wherein the connection portion is a cigarette lighter interface of the vehicle connected to the first battery and the at least one controller, and the connection portion is further configured to be connected to an external power supply, the method comprising:
controlling the switching circuit to switch to a first mode under a first condition or switch to a third mode under a third condition,
wherein controlling the switching circuit to switch to the first mode under the first condition comprises:
in the first mode, connecting the connection portion to the at least one controller through a first circuit of the switching circuit; and
the first condition comprises: a voltage of the first battery is lower than a first voltage threshold, or the switching circuit receives a first signal, and the first signal is used to control the switching circuit to work in the first mode; and
wherein controlling the switching circuit to switch to the third mode under a third condition comprises:
in the third mode, enabling the vehicle to supply power to the connection portion through the first circuit; and
the third condition comprises: the switching circuit receives a third signal, and the third signal is used to control the switching circuit to work in the third mode.

4. The method according to claim 3, further comprising:
controlling the switching circuit to switch to a second mode under a second condition, wherein controlling the switching circuit to switch to the second mode under the second condition comprises:
in the second mode, connecting the connection portion to the first battery through a second circuit; and
the second condition comprises: a voltage of the first battery is higher than a second voltage threshold, or the switching circuit receives a second signal, and the second signal is used to control the switching circuit to work in the second mode.

5. A non-transitory computer-readable storage medium, wherein the non-transitory computer-readable storage medium stores program instructions, and when the program instructions are executed by a computer of a vehicle, cause the computer to perform operations for controlling a power system of the vehicle, wherein the vehicle comprises a first battery, at least one controller, a switching circuit, and a connection portion, wherein the connection portion is a cigarette lighter interface of the vehicle connected to the first battery and the at least one controller, and the connection portion is further configured to be connected to an external power supply; the operations comprising:

controlling the switching circuit to switch to a first mode under a first condition or switch to a third mode under a third condition, wherein controlling the switching circuit to switch to the first mode under the first condition comprises:

in the first mode, connecting the connection portion to the at least one controller through a first circuit of the switching circuit; and the first condition comprises: a voltage of the first battery is lower than a first voltage threshold, or the switching circuit receives a first signal, and the first signal is used to control the switching circuit to work in the first mode; and wherein controlling the switching circuit to switch to the third mode under a third condition comprises:

in the third mode, enabling the vehicle to supply power to the connection portion through the first circuit; and the third condition comprises: the switching circuit receives a third signal, and the third signal is used to control the switching circuit to work in the third mode.

6. The non-transitory computer-readable storage medium according to claim 5, the operations further comprising:

controlling the switching circuit to switch to a second mode under a second condition, wherein controlling the switching circuit to switch to the second mode under the second condition comprises:

in the second mode, connecting the connection portion to the first battery through a second circuit; and the second condition comprises: a voltage of the first battery is higher than a second voltage threshold, or the switching circuit receives a second signal, and the second signal is used to control the switching circuit to work in the second mode.

* * * * *